(12) United States Patent
Yamamoto et al.

(10) Patent No.: US 12,113,619 B2
(45) Date of Patent: Oct. 8, 2024

(54) TERMINAL, BASE STATION, AND COMMUNICATION METHOD

(71) Applicant: Panasonic Intellectual Property Corporation of America, Torrance, CA (US)

(72) Inventors: Tetsuya Yamamoto, Kanagawa (JP); Hongchao Li, Langen (DE); Hidetoshi Suzuki, Kanagawa (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 18/040,247

(22) PCT Filed: May 20, 2021

(86) PCT No.: PCT/JP2021/019148
§ 371 (c)(1),
(2) Date: Feb. 1, 2023

(87) PCT Pub. No.: WO2022/030069
PCT Pub. Date: Feb. 10, 2022

(65) Prior Publication Data
US 2023/0308214 A1    Sep. 28, 2023

(30) Foreign Application Priority Data
Aug. 6, 2020    (JP) .................... 2020-133858

(51) Int. Cl.
*H04L 1/16*      (2023.01)
*H04W 28/04*    (2009.01)
*H04W 72/12*    (2023.01)

(52) U.S. Cl.
CPC .............. *H04L 1/16* (2013.01); *H04W 28/04* (2013.01); *H04W 72/12* (2013.01)

(58) Field of Classification Search
None
See application file for complete search history.

(56) References Cited

U.S. PATENT DOCUMENTS

| 11,811,536 B2 * | 11/2023 | Karaki .................. H04L 1/1812 |
| 2014/0328260 A1 * | 11/2014 | Papasakellariou .... H04W 72/23 370/329 |

(Continued)

FOREIGN PATENT DOCUMENTS

JP    2020519132 A    6/2020

OTHER PUBLICATIONS

T.-K. Le, U. Salim and F. Kaltenberger, "Control and data channel combining in Ultra-Reliable Low-Latency Communication," 2019 53rd Asilomar Conference on Signals, Systems, and Computers, Pacific Grove, CA, USA, 2019, pp. 1982-1986, doi: 10.1109/IEEECONF44664.2019.9048795. (Year: 2019).*

(Continued)

*Primary Examiner* — Daniel F. McMahon
(74) *Attorney, Agent, or Firm* — Seed IP Law Group LLP

(57) ABSTRACT

The present disclosure is directed to downlink retransmission control. A terminal includes a control circuit that performs retransmission control for a plurality of transport blocks in units of code block groups including at least one code block, and a communication circuit that performs communication according to the retransmission control.

16 Claims, 26 Drawing Sheets

(56) References Cited

U.S. PATENT DOCUMENTS

| | | | |
|---|---|---|---|
| 2018/0167932 A1 | 6/2018 | Papasakellariou | |
| 2019/0074937 A1 | 3/2019 | Bhattad et al. | |
| 2020/0059327 A1 | 2/2020 | Kini et al. | |
| 2020/0314815 A1* | 10/2020 | Kim | H04L 1/1671 |
| 2021/0234643 A1* | 7/2021 | Wang | H04L 1/1887 |
| 2022/0007173 A1* | 1/2022 | Zhang | H04L 5/0035 |
| 2023/0056251 A1* | 2/2023 | Lin | H04W 72/23 |
| 2023/0216614 A1* | 7/2023 | Wang | H04L 1/1854 |
| | | | 370/329 |
| 2023/0254856 A1* | 8/2023 | Liu | H04L 5/0098 |
| | | | 370/329 |
| 2023/0299900 A1* | 9/2023 | Gao | H04W 72/232 |
| | | | 370/330 |
| 2024/0023098 A1* | 1/2024 | Wang | H04W 72/232 |

OTHER PUBLICATIONS

T.-K. Le, U. Salim and F. Kaltenberger, "Control and data channel combining in Ultra-Reliable Low-Latency Communication," 2019 53rd Asilomar Conference on Signals, Systems, and Computers, Pacific Grove, CA, USA, 2019, pp. 1982-1986, (Year: 2019).*

Apple Inc., "HARQ and scheduling enhancements for NR-U," R1-1912807, Agenda Item: 7.2.2.2.3, 3GPP TSG-RAN WG1 #99, Reno, USA, Nov. 18-22, 2019, 5 pages.

Extended European Search Report dated Jan. 11, 2024, for the corresponding European Patent Application No. 21853888.2, 13 pages.

Qualcomm Incorporated, "Enhancements to Scheduling and HARQ operation for NR-U," R1-1905001, Agenda Item: 7.2.2.2.3, 3GPP TSG RAN WG1 Meeting #96b, Xi'an, China, Apr. 8-12, 2019, 13 pages.

3GPP, "3rd Generation Partnership Project; Technical Specification Group Radio Access Network; Evolved Universal Terrestrial Radio Access (E-UTRA); Multiplexing and channel coding (Release 16)," 3GPP TS 36.212 V16.1.0, Mar. 2020. (253 pages).

3GPP, "3rd Generation Partnership Project; Technical Specification Group Radio Access Network; Evolved Universal Terrestrial Radio Access (E-UTRA); Physical layer procedures (Release 16)," 3GPP TS 36.213 V16.1.0, Mar. 2020. (570 pages).

3GPP, "3rd Generation Partnership Project; Technical Specification Group Radio Access Network; NR; Multiplexing and channel coding (Release 16)," 3GPP TS 38.212 V16.1.0, Mar. 2020. (146 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical layer procedures for data (Release 16)," 3GPP TS 38.214 V16.9.0, Mar. 2022. (173 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

Ericsson, "Revised SID on Study on support of reduced capability NR devices," RP-201386, Agenda Item: 9.9.5, 3GPP TSG RAN Meeting #88e, Electronic Meeting, Jun. 29-Jul. 3, 2020. (5 pages).

International Search Report, mailed Jul. 27, 2021, for International Patent Application No. PCT/JP2021/019148. (5 pages) (with English translation).

ITU, "IMT Vision—Framework and overall objectives of the future development of IMT for 2020 and beyond," Recommendation ITU-R M.2083-0, Sep. 2015. (21 pages).

MediaTek Inc., "Revised WID UE Power Saving Enhancements for NR," RP-200938 Agenda Item: 9.10.7, 3GPP TSG RAN meeting #88e, Electronic Meeting, Jun. 29-Jul. 3, 2020. (5 pages).

* cited by examiner

| PRI | PUCCH resource for TB#0 | PUCCH resource for TB#1 |
|---|---|---|
| 0 | PUCCH resource #0-0 | PUCCH resource #1-0 |
| 1 | PUCCH resource #0-1 | PUCCH resource #1-1 |
| 2 | PUCCH resource #0-2 | PUCCH resource #1-2 |
| 3 | PUCCH resource #0-3 | PUCCH resource #1-3 |
| 4 | PUCCH resource #0-4 | PUCCH resource #1-4 |
| 5 | PUCCH resource #0-5 | PUCCH resource #1-5 |
| 6 | PUCCH resource #0-6 | PUCCH resource #1-6 |
| 7 | PUCCH resource #0-7 | PUCCH resource #1-7 |

FIG. 18

TERMINAL, BASE STATION, AND COMMUNICATION METHOD

TECHNICAL FIELD

The present disclosure relates to a terminal, a base station, and a communication method.

BACKGROUND ART

In recent years, a dramatic development of Internet of Things (IoT) has been expected with the expansion and diversification of radio services as a background. The usage of mobile communication is expanding to all fields such as automobiles, houses, home electric appliances, or industrial equipment in addition to information terminals such as smart phones. In order to support the diversification of services, a substantial improvement in the performance and function of mobile communication systems has been required for various requirements such as an increase in the number of connected devices or low latency in addition to an increase in system capacity. The 5th generation mobile communication systems (5G) can flexibly provide radio communication in response to a wide variety of needs by enhanced mobile broadband (eMBB), massive machine type communication (mMTC), and ultra reliable and low latency communication (URLLC).

The 3rd Generation Partnership Project (3GPP) as an international standardizing body has been specifying New Radio (NR) as one of 5G radio interfaces.

CITATION LIST

Non-Patent Literature

NPL 1
RP-201386, "Revised SID on Study on support of reduced capability NR devices," Ericsson, Jun. 29-Jul. 3, 2020.
NPL 2
RP-200938. "Revised WID UE Power Saving Enhancements for NR," MediaTek Inc., Jun. 29-Jul. 3, 2020.
NPL 3
3GPP TS36.212, "Evolved Universal Terrestrial Radio Access (E-UTRA): Multiplexing and channel coding (Release 16)," March 2020.
NPL 4
3GPP TS36.213, "Evolved Universal Terrestrial Radio Access (E-UTRA): Physical layer procedures (Release 17)," March 2020.
NPL 5
3GPP TS38.212, "NR; Multiplexing and channel coding (Release 16)," March 2020.
NPL 6
3GPP TS38.214, "NR: Physical layer procedures for data (Release 16)," March 2020.

SUMMARY OF INVENTION

Technical Problem

However, there is room for discussion on retransmission control in downlink (DL).

One non-limiting and exemplary embodiment of the present disclosure facilitates providing a terminal, a base station, and a communication method each capable of improving the efficiency of retransmission control in downlink.

A terminal according to an exemplary embodiment of the present disclosure includes: control circuitry, which, in operation, executes retransmission control for a plurality of transport blocks in units of code block groups each including at least one of code blocks in any one or more of the plurality of transport blocks; and communication circuitry, which, in operation, performs communication according to the retransmission control.

It should be noted that general or specific embodiments may be implemented as a system, a method, an integrated circuit, a computer program, a storage medium, or any selective combination thereof.

According to an exemplary embodiment of the present disclosure, it is possible to improve the efficiency of retransmission control in downlink.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 18 illustrates an exemplary combination of PUCCH resources according to Embodiment 2;

DESCRIPTION OF EMBODIMENTS

Hereinafter, embodiments of the present disclosure will be described in detail with reference to the accompanying drawings.

In the future, for example, further development of 5G or technology development of the 6th generation mobile communication systems (6G) is expected. For example, most of early 5G terminals supporting NR are occupied by high-end models. Moreover, in Rel. 16, a discussion has been made on specifications for high-performance IoT such as IoT for industries with strict requirements. On the other hand, for example, low power consumption of terminals is expected for devices with relatively less complicated structures, such as industrial cameras, wearable products, and low-cost smartphones (see, for example, Non-Patent Literature (hereinafter referred to as NPL) 1 or 2).

An example of a technique to reduce power consumption of a terminal includes a method in which a terminal intermittently receives a downlink control channel (e.g., PDCCH: Physical Downlink Control Channel) to reduce the number of times of blind decoding for PDCCH reception, thereby suppressing power consumption of the terminal. However, for example, the lower the reception frequency of the PDCCH due to the intermittent reception of the PDCCH, the less the allocation occasion of data schedulable by the PDCCH, which may decrease the transmission efficiency.

For example, scheduling of a plurality of Transport Blocks (TBs) (e.g., multi-TB scheduling) is included in an example of a method for suppressing power consumption of a terminal by reducing the reception frequency of the PDCCH and suppressing a decrease of the transmission efficiency.

Figure 1:
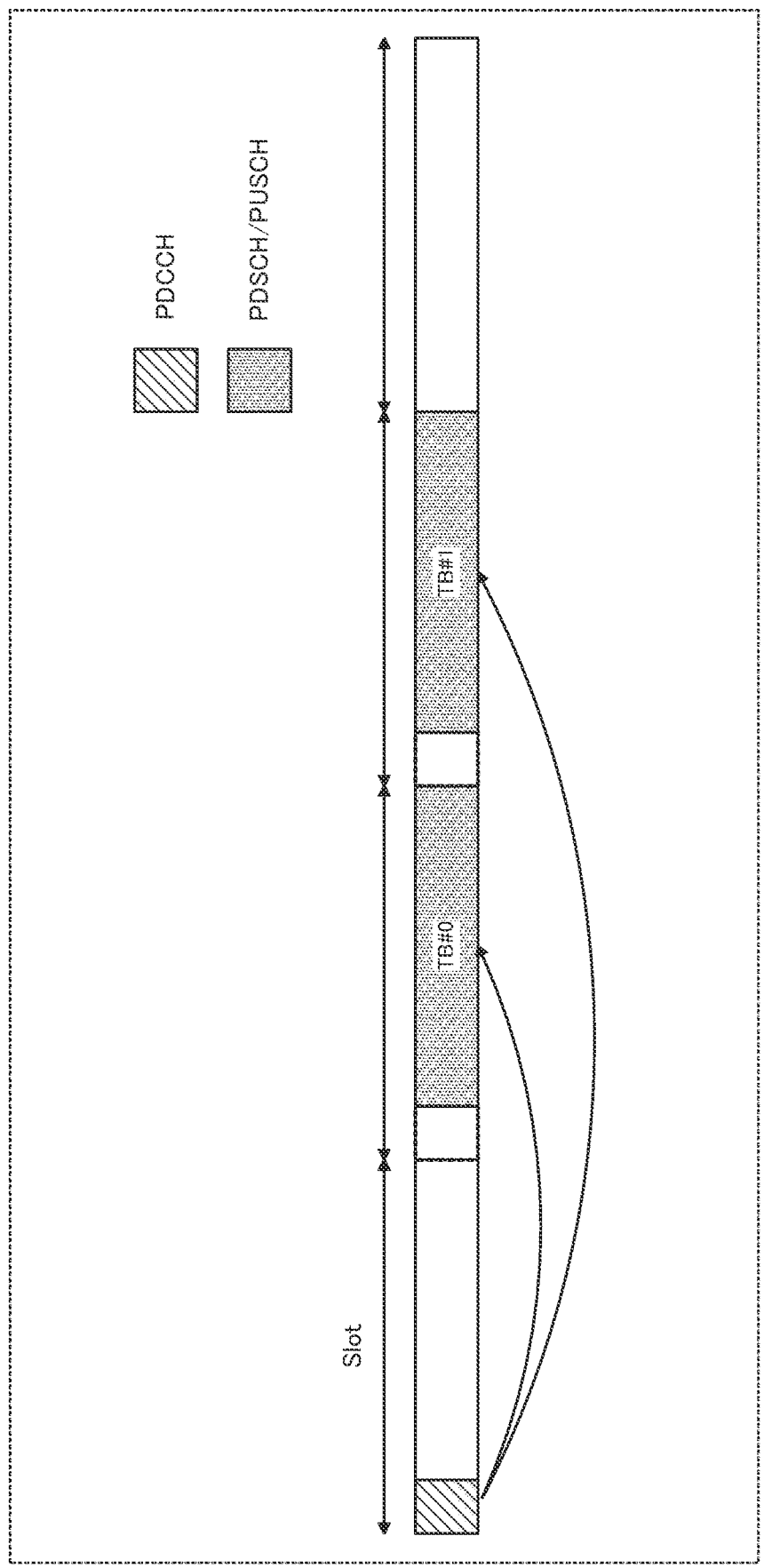
FIG. 1 illustrates an example of multiple-Transport Blok (-TB) scheduling.

FIG. 1 illustrates an example of multiple-TB scheduling. For example, a downlink control signal (e.g., DCI: Downlink Control Information) including scheduling information, such as resource allocation from a base station (e.g., also referred to as gNB), may be transmitted via PDCCH. A terminal (e.g., also referred to as User Equipment (UE)) may, for example, according to the resource allocation indicated by the DCI on the PDCCH, receive a downlink data signal (e.g., PDSCH: Physical Downlink Shared Channel) or transmit an uplink data signal (e.g., PUSCH: Physical Uplink Shared Channel).

In scheduling that is different from the multiple-TB scheduling, for example, one PDSCH or PUSCH is indicated by one DCI, and the number of TBs (or referred to as data blocks) included in one PDSCH or one PUSCH may be one or may be two in the case of spatial multiplexing transmission in the same time- and frequency-resource. On the other hand, as illustrated in FIG. 1, in the multiple-TB scheduling, for example, it is possible to assign a plurality of PDSCHs or PUSCHs (e.g., expressed as PDSCH/PUSCH) transmitted and received in different times or frequencies by one DCI. In addition, for example, in the multiple-TB scheduling, as illustrated in FIG. 1, each PDSCH or PUSCH may include a plurality of different TBs. Thus, in the multiple-TB scheduling, for example, a plurality of TBs transmitted and received in different times or frequencies can be scheduled by one DCI.

The multiple-TB scheduling has been employed for, for example, uplink transmission using an NR unlicensed band (e.g., also referred to as NR-Unlicensed (NR-U) and uplink transmission and downlink transmission of enhanced Machine Type Communication (eMTC) of Long Term Evolution (LTE) and Narrow Band-IoT (NB-IoT) (e.g., see NPLs 3 to 6).

In NR, the multiple-TB scheduling is applied to the uplink transmission using the unlicensed band, but is not applied to downlink transmission. For example, when the multiple-TB scheduling is applied to the downlink transmission, the terminal may transmit, for retransmission control, a response signal for a PDSCH. However, in NR, there is room for discussion on retransmission control including a feedback of a response signal for downlink data (e.g., PDSCH) assigned by the multiple-TB scheduling. Note that the response signal may be referred to as, for example, an Acknowledgement/Negative Acknowledgement (ACK/NACK) or a Hybrid Automatic Repeat Request-ACK (HARQ-ACK).

Further, for example, in eMTC or NB-IoT of LTE, the multiple-TB scheduling has been employed for the uplink transmission and the downlink transmission, and retransmission control including an ACK/NACK feedback for data subjected to multiple-TB scheduling (e.g., PDSCH or PUSCH) has been specified by standards. However, in LTE, for example, a scheme for re-transmitting the entire TB transmitted and received at the initial time (e.g., TB-based retransmission) is specified, whereas in NR, when a TB includes a plurality of Code Blocks (e.g., CBs), a scheme for re-transmitting, rather than the entire TB, among Code Block Groups (CBGs) each including at least one CB, a CBG with an error (e.g., CBG-based retransmission) is specified. For this reason, there is scope for discussion on the CBG-based retransmission control for data assigned by the multiple-TB scheduling, and an ACK/NACK feedback method.

Hence, in one non-limiting and exemplary embodiment of the present disclosure, for example, a description will be given of a CBG-based retransmission control method in the multiple-TB scheduling. According to one non-limiting and exemplary embodiment of the present disclosure, for example, CBG based retransmission control can be appropriately executed in the multiple-TB scheduling.

Embodiment 1

[Overview of Communication System]

A communication system according to each embodiment of the present disclosure includes base station 100 and terminal 200.

Figure 2:
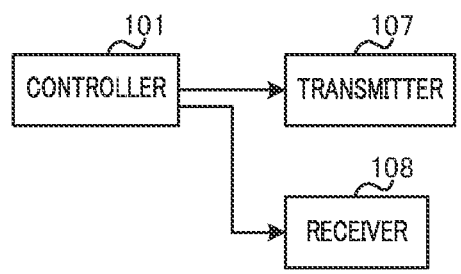
FIG. 2 is a block diagram illustrating an exemplary configuration of a part of a base station.

FIG. 2 is a block diagram illustrating an exemplary configuration of a part of base station 100 according to an exemplary embodiment of the present disclosure. In base station 100 illustrated in FIG. 2, controller 101 (e.g., corresponding to control circuit) executes retransmission control for a plurality of TBs in units of CBGs each including at least one CB in any one or more of the plurality of TBs. Transmitter 107 and receiver 108 (e.g., corresponding to communication circuitry) perform communication with terminal 200 in accordance with the retransmission control.

Figure 3:
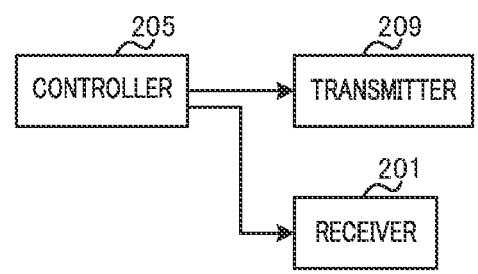
FIG. 3 is a block diagram illustrating an exemplary configuration of a part of a terminal.

FIG. 3 is a block diagram illustrating an exemplary configuration of a part of terminal 200 according to an exemplary embodiment of the present disclosure. In terminal 200 illustrated in FIG. 3, controller 205 (e.g., corresponding to control circuit) executes retransmission control for a plurality of TBs in units of CBGs each including at least one CB in any one or more of the plurality of TBs. Receiver 201 and transmitter 209 (e.g., corresponding to communication circuitry) perform communication with base station 100 in accordance with the retransmission control.

[Configuration of Base Station]

Figure 4:
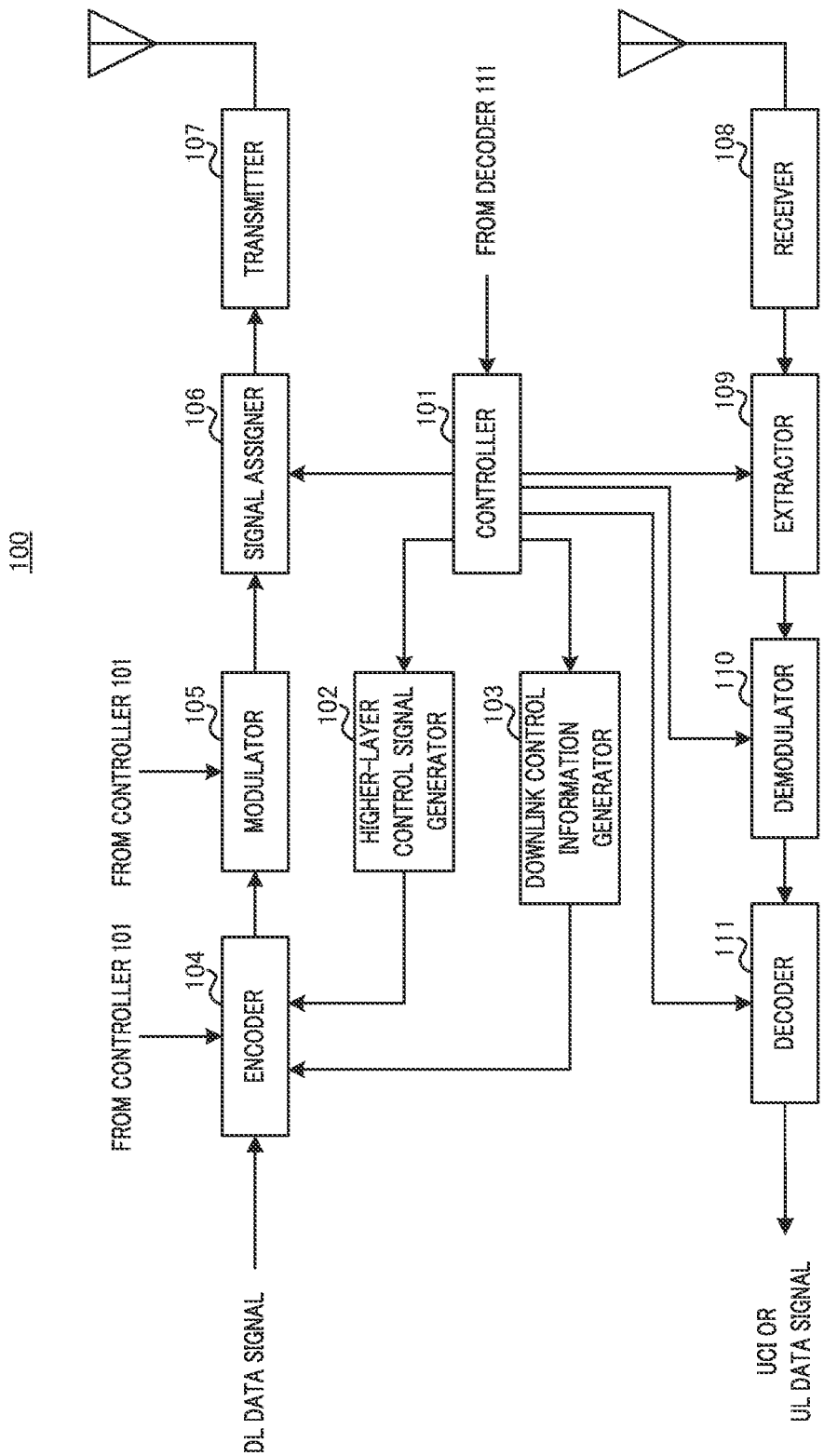
FIG. 4 is a block diagram illustrating an exemplary configuration of the base station.

FIG. 4 is a block diagram illustrating an exemplary configuration of base station 100 according to Embodiment 1. In FIG. 4, base station 100 includes controller 101, higher-layer control signal generator 102, downlink control information generator 103, encoder 104, modulator 105, signal assigner 106, transmitter 107, receiver 108, extractor 109, demodulator 110, and decoder 111.

Controller 101, for example, determines information on multiple-TB scheduling and retransmission control for terminal 200 and outputs the determined information to higher-layer control signal generator 102 or downlink control information generator 103.

The information on the multiple-TB scheduling may include, for example, information on the number of assigned TBs. Meanwhile, the information on the retransmission control may include, for example, information on the number of CBGs and information on PUCCH resource allocation.

The information on the multiple-TB scheduling and the information on the retransmission control may be output to extractor 109, demodulator 110, and decoder 111 for PUCCH reception, for example.

Controller 101 may also, for example, determine information on reception of a downlink data signal (e.g., PDSCH) for terminal 200 and output the determined information to higher-layer control signal generator 102. The information on the PDSCH reception may include, for example, information on a Time Domain Resource Allocation (TDRA) table.

Controller 101 also determines information on a downlink signal for transmitting a downlink signal data signal, a higher-layer control signal (e.g., RRC signal), or downlink control information (e.g., DCI), for example. The information on the downlink signal may include information such as an encoding and modulation scheme (MCS: Modulation and Coding Scheme) and radio resource allocation. Controller 101, for example, outputs the determined information to encoder 104, modulator 105, and signal assigner 106. In addition, controller 101 outputs information on the downlink signal, such as the higher-layer control signal, to downlink control information generator 103.

Meanwhile, when receiving a response signal (e.g., HARQ-ACK) from terminal 200, for example, controller 101 may generate the information on the retransmission control based on an HARQ-ACK bit sequence input from decoder 111. The information on the retransmission control may include, for example, configuration information such as an identification number relating to the retransmission control (e.g., HARQ process number), new data indication information (e.g., NDI: New Data Indicator), Redundancy Version (RV), CBG Transmission Information (CBGTI), or CBG Flushing out Information (CBGFI). The information on the retransmission control may be output to, for example, encoder 104, downlink control information generator 103, and decoder 111.

Incidentally, for example, in a case where the information on the multiple-TB scheduling or the information on the retransmission control is indicated by the DCI, these pieces of information may be output to downlink control information generator 103.

Further, controller 101, for example, may determine information on an uplink signal (e.g., modulation and coding scheme (MCS) and radio resource allocation) for terminal 200 to transmit an uplink data signal (e.g., PUSCH), and output the determined information to higher-layer control signal generator 102, downlink control information generator 103, extractor 109, demodulator 110, and decoder 111.

Higher-layer control signal generator 102, for example, generates a higher-layer control signal bit sequence based on information input from controller 101 and outputs the higher-layer control signal bit sequence to encoder 104.

Downlink control information generator 103, for example, generates a downlink control information (e.g., DCI) bit sequence based on information input from controller 101 and outputs the generated DCI bit sequence to encoder 104. Note that, the control information may be transmitted to a plurality of terminals.

Encoder 104, for example, encodes a downlink data signal, a bit sequence input from higher-layer control signal generator 102, or a DCI bit sequence input from downlink control information generator 103, based on information input from controller 101. Encoder 104 outputs the encoded bit sequence to modulator 105. For example, encoder 104 may generate a codeword by CB segmentation, Rate matching, or CB concatenation and apply scrambling to the downlink data signal.

In addition, at the time of initial transmission, encoder 104 may, for example, output an encoded data signal to modulator 105 while holding the encoded data signal. Further, for example, when the information on the retransmission control is input from controller 101, encoder 104 may output corresponding holding data to the data modulator. Further, encoder 104 may delete the corresponding retaining data upon receiving ACKs for all TBs or CBs of an HARQ process, for example.

Modulator 105, for example, modulates an encoded bit sequence input from encoder 104, based on information input from controller 101, and outputs the modulated signal (e.g., symbol string) to signal assigner 106.

Signal assigner 106, for example, maps, to a radio resource, a symbol string (including, for example, downlink data signal or control signal) input from modulator 105, based on radio resource-indicating information input from controller 101. Signal assigner 106 outputs, to transmitter 107, a downlink signal to which the signal is mapped.

Transmitter 107, for example, performs transmission-waveform generation processing such as Orthogonal Frequency Division Multiplexing (OFDM) on a signal input from signal assigner 106. In addition, in the case of, for example, an OFDM transmission in which a cyclic prefix (CP) is added, transmitter 107 performs Inverse Fast Fourier Transform (IFFT) processing on a signal, and adds the CP to the signal resulting from the IFFT. Moreover, transmitter 107 performs RF processing such as D/A conversion or up-conversion on a signal, and transmits the resulting radio signal to terminal 200 via an antenna.

Receiver 108, for example, performs RF processing such as down-conversion or A/D conversion on an uplink signal received from terminal 200 via the antenna. Further, in the case of the OFDM transmission, receiver 108 performs Fast Fourier Transform (FFT) processing on a received signal, and outputs the resulting frequency-domain signal to extractor 109.

Extractor 109, for example, extracts a radio resource part with which an uplink signal (e.g., PUSCH or PUCCH) to be transmitted by terminal 200 is transmitted based on information input from controller 101, and outputs the extracted radio resource part to demodulator 110.

Demodulator 110, for example, demodulates an uplink signal input from extractor 109 based on information input from controller 101. Demodulator 110, for example, outputs a demodulation result to decoder 111.

Decoder 111, for example, performs error correction decoding on an uplink signal (e.g., PUSCH or PUCCH) based on information input from controller 101 and a demodulation result input from demodulator 110 to obtain a reception bit sequence (e.g., UL data signal or UCI) after decoding. Decoder 111 may, for example, output an HARQ-ACK bit sequence included in the UCI to controller 101.

[Configuration of Terminal]

Figure 5:
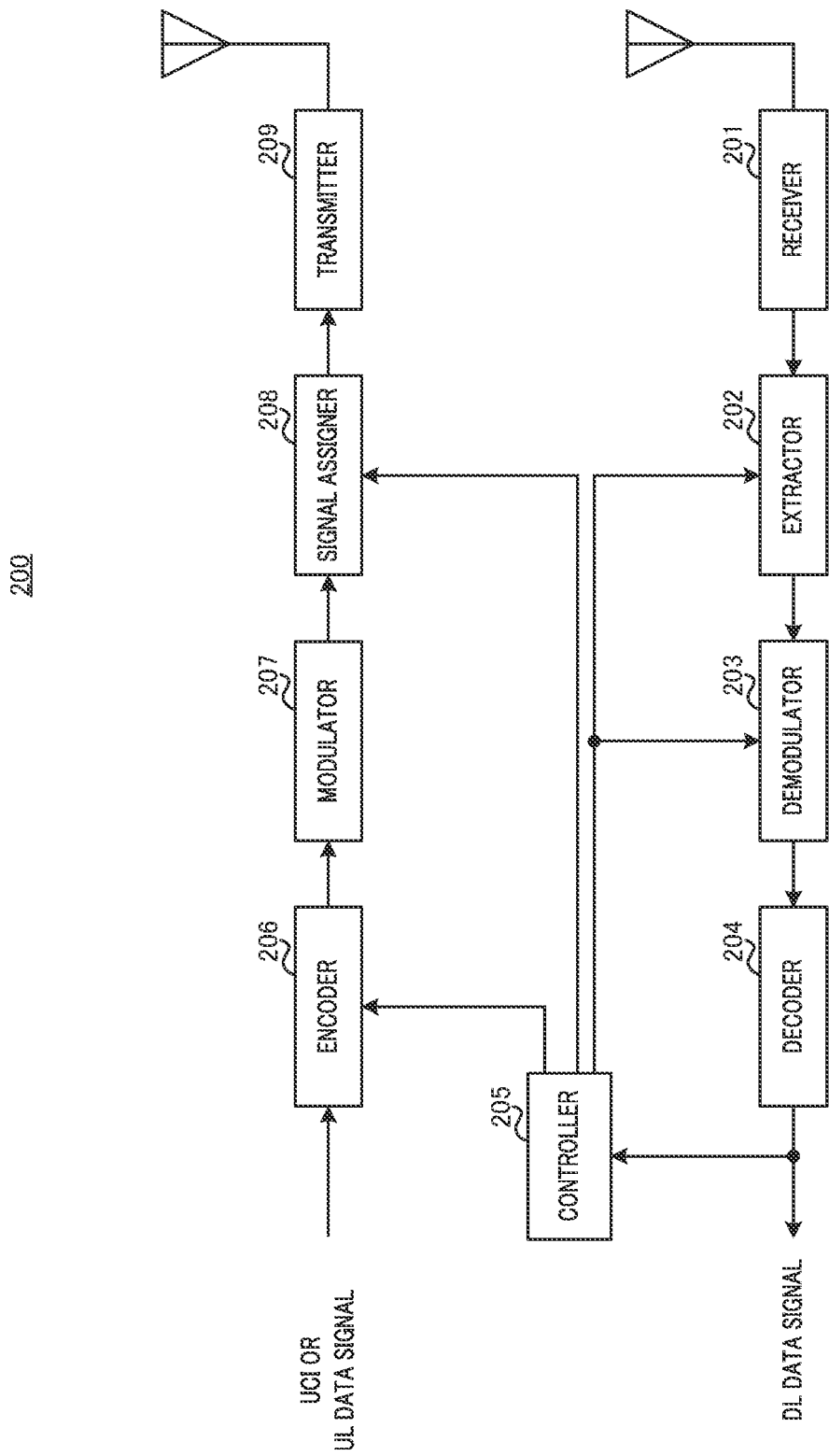
FIG. 5 is a block diagram illustrating an exemplary configuration of the terminal.

FIG. 5 is a block diagram illustrating an exemplary configuration of terminal 200 according to an exemplary embodiment of the present disclosure. For example, in FIG. 5, terminal 200 includes receiver 201, extractor 202, demodulator 203, decoder 204, controller 205, encoder 206, modulator 207, signal assigner 208, and transmitter 209.

Receiver 201, for example, receives a downlink signal (e.g., downlink data signal, higher control signal, or downlink control information) from base station 100 via an antenna, performs the RF processing such as the down-conversion or the A/D conversion on the received radio signal to obtain a received signal (baseband signal). Further, in the case of receiving an OFDM signal, receiver 201 performs the FFT processing on the received signal to convert the received signal into that in the frequency domain. Receiver 201 outputs the received signal to extractor 202.

Extractor 202, for example, extracts a radio resource part, which may include downlink control information, from a received signal input from receiver 201 based on information on a radio resource in downlink control information input from controller 205, and outputs the radio resource part to demodulator 203. Further, extractor 202 extracts a radio resource part which includes the downlink data signal or the higher-layer control signal, based on information on a radio resource for a data signal input from controller 205, and outputs the radio resource part to demodulator 203.

Demodulator 203, for example, based on the information input from controller 205, demodulates a signal input from extractor 202 and outputs a demodulation result to decoder 204.

Decoder 204, for example, performs error correction decoding on a PDCCH or a PDSCH based on a demodulation result input from demodulator 203 to obtain downlink received data, a higher-layer control signal, or downlink control information. Decoder 204 outputs the higher-layer control signal and the downlink control information to controller 205. In addition, decoder 204 may, for example, generate an HARQ-ACK bit sequence, based on a decoding result on the downlink received data, and output the HARQ-ACK bit sequence to encoder 206.

Controller 205, for example, determines a radio resource for downlink reception (e.g., reception of PDCCH or PDSCH) and uplink transmission (e.g., transmission of PUSCH or PUCCH), based on the information on the multiple-TB scheduling, the information on the retransmission control, or the information on the radio resource allocation, which is obtained from the higher-layer control signal and the downlink control information input from decoder 204. Controller 205 outputs the determined information to, for example, extractor 202, demodulator 203, encoder 206, and signal assigner 208.

Encoder 206, for example, based on the information input from controller 205, encodes an uplink signal (e.g., UCI such as HARQ-ACK bit sequence or uplink data signal) and outputs the encoded bit sequence to modulator 207.

Modulator 207, for example, modulates an encoded bit sequence input from encoder 206 and outputs the modulated signal (symbol string) to signal assigner 208.

Signal assigner 208, for example, maps a signal input from modulator 207 to a radio resource based on information input from controller 205, and outputs an uplink signal to which the signal is mapped to transmitter 209.

Transmitter 209, for example, performs the transmission-waveform generation processing such as the OFDM on a signal input from signal assigner 208. In addition, in the case of, for example, the OFDM transmission using the CP, transmitter 209 performs the IFFT processing on a signal, and adds the CP to the signal resulting from the IFFT. Alternatively, when transmitter 209 generates a single-carrier waveform, for example, a Discrete Fourier Transformer (DFT) may be additionally provided at a rear stage of modulator 207 or a front stage of signal assigner 208 (neither is illustrated). Moreover, transmitter 209, for example, performs the RF processing such as the D/A conversion or the up-conversion on a transmission signal, and transmits the resulting radio signal to base station 100 via the antenna.

[Exemplary Operations of Base Station 100 and Terminal 200]

Exemplary operations of base station 100 and terminal 200 having the above configurations will be described.

Here, a description will be given of transmission and reception processing relating to the retransmission control in NR.

Figure 6:
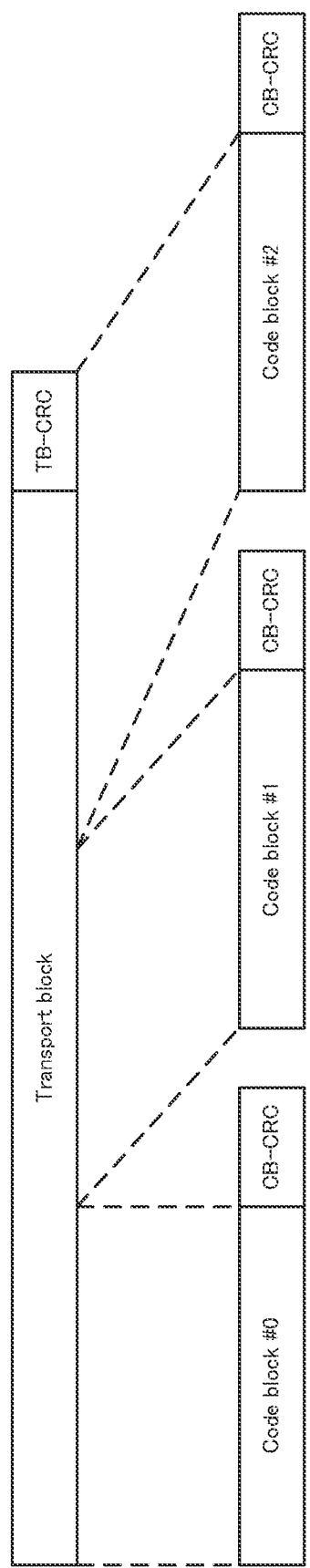
FIG. 6 illustrates an example of codeblock division.

FIG. 6 illustrates an example of transmission processing when CB segmentation is applied. On a transmission side, for example, in a case where the size of TB to which a Cyclic Redundancy Check (CRC) bit (e.g., TB-CRC) is added exceeds a threshold value, CB segmentation that divides the TB (or TB-CRC may be included) into a plurality of CBs may be applied. The threshold value may be, for example, 8424 bits when using Low-Density Parity-check Code (LDPC) base graph 1 in NR, 3840 bits when using LDPC base graph 2, or another bit different from 8424 bits and 3840 bits. For example, the CB size may be configured as a size corresponding to an encoder, and thus, for example, the threshold value may be the largest number of bits to which the encoder corresponds.

As illustrated in FIG. 6, with respect to each of CBs resulting from the CB segmentation (e.g., CB #0, CB #1, and CB #2), for example, a CRC bit (e.g., CB-CRC) may be added, and encoding (e.g., LDPC encoding) may be performed according to the configured coding rate. The encoding may generate, for example, a systematic bit and a parity bit.

In addition, in NR, for example, a Circular buffer may be used for the retransmission control (see, for example, NPL 5) The circular buffer may be, for example, a memory that stores a systematic bit and a parity bit therein, and bits of the number of bits corresponding to the allocated resource amount may be read out from a reading start position (e.g., RV: Redundancy Version) in the Circular buffer (also referred to as Rate matching, for example).

Each CB configured with the read-out encoded bits may be concatenated as a codeword, and, for example, processing such as scrambling, data modulation, and the like may be applied to the concatenated codeword.

Meanwhile, DCI including scheduling information such as resource allocation from base station 100 may be transmitted via PDCCH, for example. Terminal 200 may receive a PDSCH according to the resource allocation indicated by the DCI on the PDCCH, for example.

Terminal 200 may, for example, determine the size of TB received via PDSCH based on the MCS of the PDSCH, the time-resource amount, and the frequency-resource amount, and thus determine the number of CBs based on the TB size. In addition, terminal 200 may, for example, decode each CB and perform error detection in each CB by using the CB-CRC bit added to each CB. Further, when the CB division is applied, terminal 200 may restore a TB and perform error detection in the entire TB by using the TB-CRC added to the TB.

In NR, for example, in a case where no CBG-based retransmission is configured for terminal 200 (e.g., no higher layer parameter "PDSCH-CodeBlockGroupTransmission" is configured), terminal 200 may transmit, to the transmission side (e.g., base station 100), a response signal (e.g., ACK/NACK or HARQ-ACK) for the entire TB, according to an error detection result in the entire TB. When the NACK is indicated from terminal 200, for example, base station 100 may retransmit the entire TB.

Further, in NR, for example, in a case where the CBG-based retransmission is configured for terminal 200 (e.g., higher layer parameter "PDSCH-CodeBlockGroupTransmission" is configured), terminal 200 may execute the retransmission control in units of CBGs that groups a plurality of CBs. For example, terminal 200 may transmit, to base station 100, a response signal (e.g., ACK/NACK or HARQ-ACK) for the CBG, according to an error detection result for the CBG. By way of example, terminal 200 may indicate the ACK when all CBs included in the CBG are received without an error, and indicate the NACK when an error is detected in at least one of CBs included in the CBG. Base station 100 may, for example, re-transmit the CBG to which the NACK has been indicated from terminal 200. In other words, base station 100 need not re-transmit the CBG to which the ACK has been indicated from terminal 200, for example.

Further, in NR, for example, regardless of whether a TB is divided into a plurality of CBs, a HARQ process is assigned for each TB. Here, the HARQ process is a processing unit for the retransmission control, and each HARQ process may be identified by a HARQ process number. For example, a plurality of HARQ processes may be configured for terminal 200, and retransmission of data may be performed until an ACK is received for a TB or all CBGs which has/have the identical HARQ process number. The retransmission can be controlled by, for example, including the HARQ process number, the NDI, and the RV in the DCI for assigning the PDSCH that transmits the TB. Here, the NDI is, for example, a notification indicating whether initial transmission or retransmission. By way of example, the NDI may indicate the retransmission in a case where the NDI is not toggled in the identical HARQ process (e.g., in the case of same value as previous one) and may indicate the initial transmission in a case where the NDI is toggled (e.g., in the case of different value as previous one).

In NR, for example, CBG-based retransmission control for scheduling for one TB has been specified. In contrast, in NR, CBG-based retransmission for multiple-TB scheduling is not specified. Therefore, in the present embodiment, for example, a description will be given of the CBG-based retransmission with the multiple-TB scheduling applied, by repurposing the above-mentioned retransmission control in NR as much as possible.

In the present embodiment, for example, a common (e.g., identical) HARQ process number may be assigned to a plurality of TBs subjected to multiple-TB scheduling (hereinafter may also be referred to as multiple-TB scheduled TBs). Base station 100 and terminal 200 may, for example, execute the retransmission control in units of CBGs each including at least one CB in any one or more of the plurality of TBs, based on the number of TBs assigned by the multiple-TB scheduling.

In the following, as an example, the number of TBs assigned by the multiple-TB scheduling (e.g., the number of assigned TBs) is assumed to be "N" (e.g., N>1).

A transmission side (e.g., base station 100) may apply, to each TB, processing such as CB segmentation, encoding per CB, Rate matching, CB concatenation, scrambling, and data-modulation, for example.

Meanwhile, DCI including scheduling information such as resource allocation from base station 100 may be transmitted to terminal 200 via PDCCH, for example. Terminal 200 may receive a PDSCH according to the resource allocation indicated by the DCI on the PDCCH, for example. In the multiple-TB scheduling, for example, a plurality of PDSCHs may be assigned to different time- or frequency-resources by one DCI. Further, each PDSCH may include, for example, a different TB. In other words, a plurality of TBs received in different time- or frequency-resources can be scheduled by one DCI. Incidentally, the MCS of the PDSCH assigned for each TB, the time resource amount (e.g., the number of symbols), or the frequency resource amount (e.g., the number of resource blocks) may be different from each other, or at least one of them may be common (e.g., identical) between TBs.

Terminal 200 may, for example, determine the size of TB received via PDSCH based on the MCS of each PDSCH, the time-resource amount, and the frequency-resource amount, and thus determine the number of CBs based on the TB size. In addition, terminal 200 may, for example, decode each CB and perform error detection in each CB by using the CB-CRC bit added to each CB. Further, when the CB division is used, terminal 200 may restore a TB and perform error detection in the entire TB by using the TB-CRC added to the TB.

In the present embodiment, for example, as a parameter relating to the CBG-based retransmission, the number of CBs "M" in a plurality (e.g., N pieces) TBs may be set to terminal 200. Terminal 200 may determine the number of CBs included in a CBG, based on the number of assigned TBs, N, the number of CBGs, M, in N pieces of TBs, and the number of CBs "Cn" (n=0 to N−1) included in each TB, for example.

Terminal 200 may, for example, transmit, to base station 100, a response signal for the CBG, according to an error detection result for the CBG. By way of example, terminal 200 may indicate the ACK when all CBs included in the CBG are received without an error and indicate the NACK when an error is detected in at least one of CBs included in the CBG. Base station 100 may, for example, re-transmit the CBG corresponding to the NACK that has been indicated from terminal 200.

Figure 7:
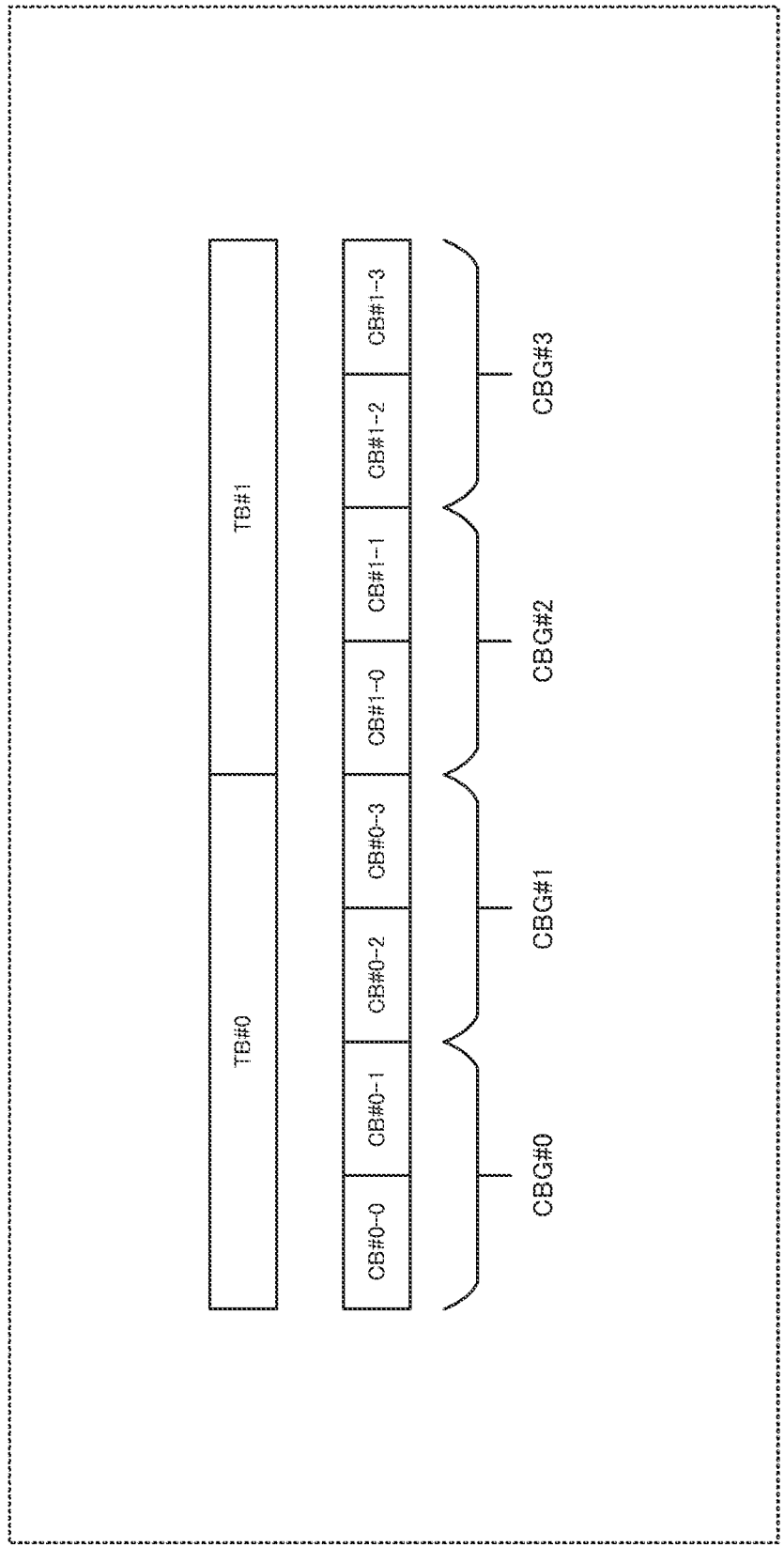
FIG. 7 illustrates an exemplary configuration of a Code Block Group (CBG) according to Embodiment 1.

FIG. 7 illustrates an exemplary configuration of a CBG of a case where the number of assigned TBs, N=2, the number of CBGs, M=4, and the number of CBGs of each TB C0=C1=4, as an example. As illustrated in FIG. 7, since the number of CBs included in the TBs of N=2 TBs that is assigned by the multiple-TB scheduling is eight, for example, the number of CBs included in each of M=4 pieces of CBGs is two. Note that the number of CBs included in each CBG may be the identical or different.

Incidentally, the number of CBGs, M, to be set to terminal 200 may be the largest number of CBGs, that is, Mmax. In this case, the actual number of CBGs, M, may be determined according to the following Expression 1, for example.

[1]

$$M = \min\left(M_{max}, \sum_{n=0}^{N-1} C_n\right) \quad \text{(Expression 1)}$$

Further, for example, in a case where a result of the following Expression 2 is an integer, the number of CBs included in each of CBGs may beset by the following Expression 3.

[2]

$$\left(\sum_{n=0}^{N-1} C_n\right)/M \quad \text{(Expression 2)}$$

[3]

$$\left(\sum_{n=0}^{N-1} C_n\right)/M \quad \text{(Expression 3)}$$

On the other hand, in a case where a result of the following Expression 4 is not an integer, the number of CBs included in each of CBG #0 to CBG #M−2 may be set by the following Expression 5, and the number of CBs included in CBG #M−1 may be set by the following Expression 6.

[4]

$$\left(\sum_{n=0}^{N-1} C_n\right)/M \quad \text{(Expression 4)}$$

[5]

$$\left\lceil\left(\sum_{n=0}^{N-1} C_n\right)/M\right\rceil \quad \text{(Expression 5)}$$

[6]

$$\left(\sum_{n=0}^{N-1} C_n\right) - (M-1)\left\lceil\left(\sum_{n=0}^{N-1} C_n\right)/M\right\rceil \quad \text{(Expression 6)}$$

Here, the CBG including a CB in the following Expression 7 is not limited to CBG #M−1 and may be CBG #0 or another CBG.

[7]

$$\left(\sum_{n=0}^{N-1} C_n\right) - (M-1)\left\lceil\left(\sum_{n=0}^{N-1} C_n\right)/M\right\rceil \quad \text{(Expression 7)}$$

In addition, the method of determining the number of CBs included in a CBG is not limited to the above-mentioned example. For example, assuming the following Expression 8, and then the number of CBs included in each of CBG #0 to CBG #$M_1$−1 may be set by the following Expression 9, and the number of CBs included in each of CBG #M, to CBG #M−1 may be set by the following Expression 10.

[8]

$$M_1 = \mathrm{mod}\left(\sum_{n=0}^{N-1} C_n, M\right) \quad \text{(Expression 8)}$$

[9]

$$\left\lceil\frac{\sum_{n=0}^{N-1} C_n}{M}\right\rceil \quad \text{(Expression 9)}$$

[10]

$$\left\lfloor\frac{\sum_{n=0}^{N-1} C_n}{M}\right\rfloor \quad \text{(Expression 10)}$$

Further, as mentioned above, a common (e.g., identical) HARQ process may be assigned to a plurality of multiple-TB scheduled TBs. For example, in the identical HARQ process number, data may be re-transmitted until the ACKs are received for all TBs or all CBGs.

The retransmission can be controlled by, for example, the DCI including the HARQ process number, the NDI, and the RV. Meanwhile, the CBG-based retransmission can be controlled by, for example, the DCI including the CBGTI and the CBGFI.

For example, in a case where the NDI is not toggled (e.g., case of retransmission) in the identical HARQ process, the CBGTI may indicate a CBG to be re-transmitted. For example, when the number of CBGs is four, CBGTI=0001 may indicate that CBG #0 to CBG #2 are not re-transmitted whereas CBG #3 is re-transmitted.

Further, the CBGFI may be, for example, a notification indicating whether the re-transmitted CBG can be combined with the previously transmitted CBG. In other words, the CBGFI may be, for example, a notification indicating whether a buffer of the CBG that is previously received is valid. For example, when CBGFI=0, it may be indicated that the buffer of the CBG previously received by terminal 200 is invalid, and when CBGFI=1, it may be indicated that the buffer of the CBG previously received by terminal 200 is valid.

According to the present embodiment, even in the multiple-TB scheduling, the CBG retransmission can be controlled using (i.e., repurposing) the indication of the HARQ process, the NDI, the RV, the CBGTI, and the CBGFI in NR, by determining the number of CBGs included in a CBG based on the number of CBGs, the number of assigned TBs, and the number of CBs in each of TBs.

Incidentally, a relation between the number of assigned TBs, N, the number of CBGs, M, and the number of CBs, $C_n$, (n=0 to N−1) in each TB is as follows.

<Case where M=1>

Figure 8:
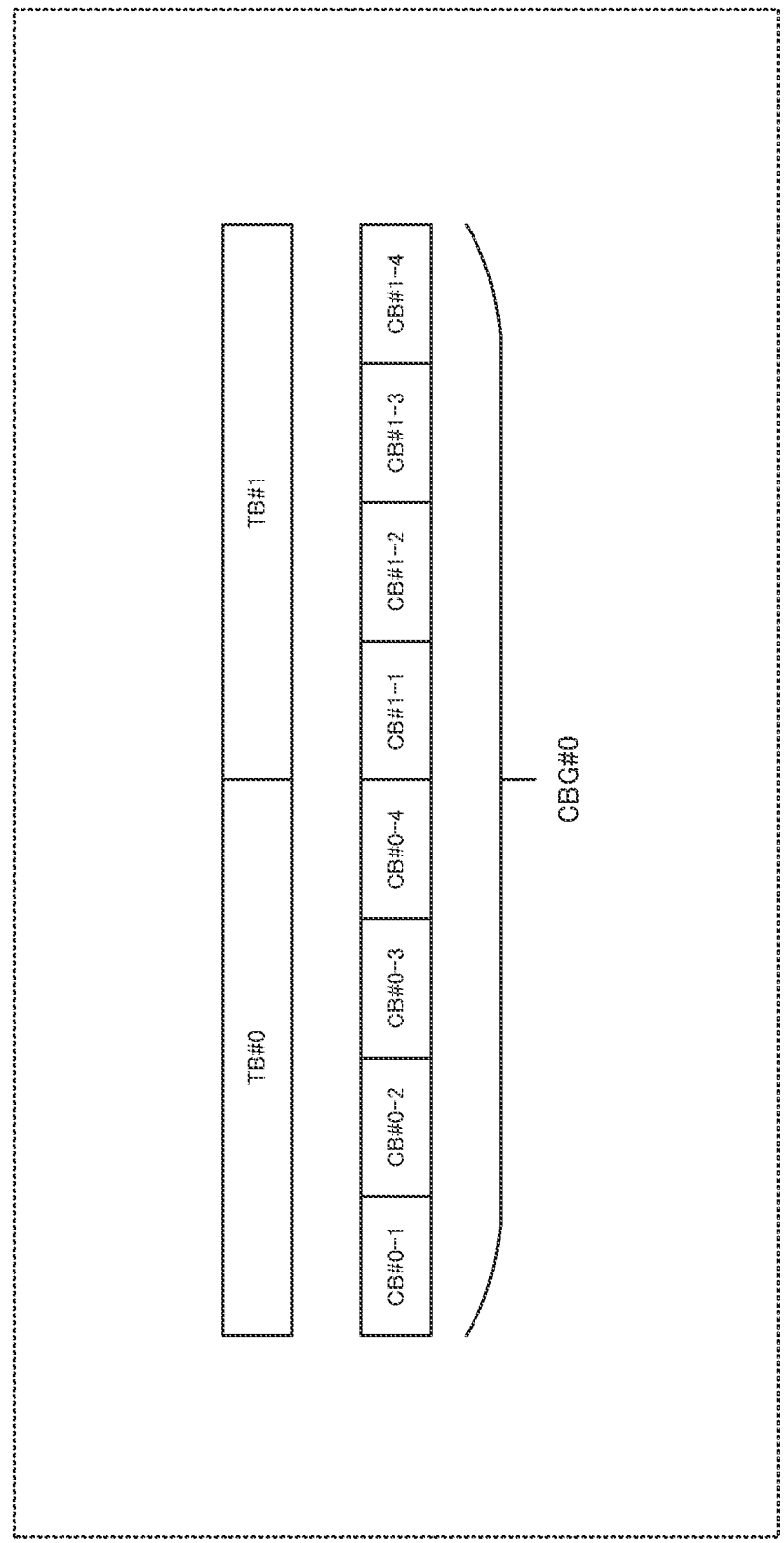
FIG. 8 illustrates another exemplary configuration of the CBG according to Embodiment 1.

FIG. 8 illustrates an exemplary configuration of a CBG of a case where M=1.

When M=1, all CBs included in a plurality of TBs to be multiple-TB scheduled may be included in one CBG. For example, in FIG. 8, eight (=four CBs×two TBs) pieces of CBs included in the TBs of N=2 TBs to be multiple-TB scheduled may be included in one CBG #0.

For example, when all CBs included in the CBG are received without an error, terminal 200 may indicate the ACK to base station 100, and when an error is detected in at least one of the CBs included in the CBG, terminal 200 may indicate the NACK to base station 100.

An operation of a case where M=1 is equivalent to, for example, an operation of bundling response signals for the plurality of TBs.

<Case where 1<M<N>

Figure 9:
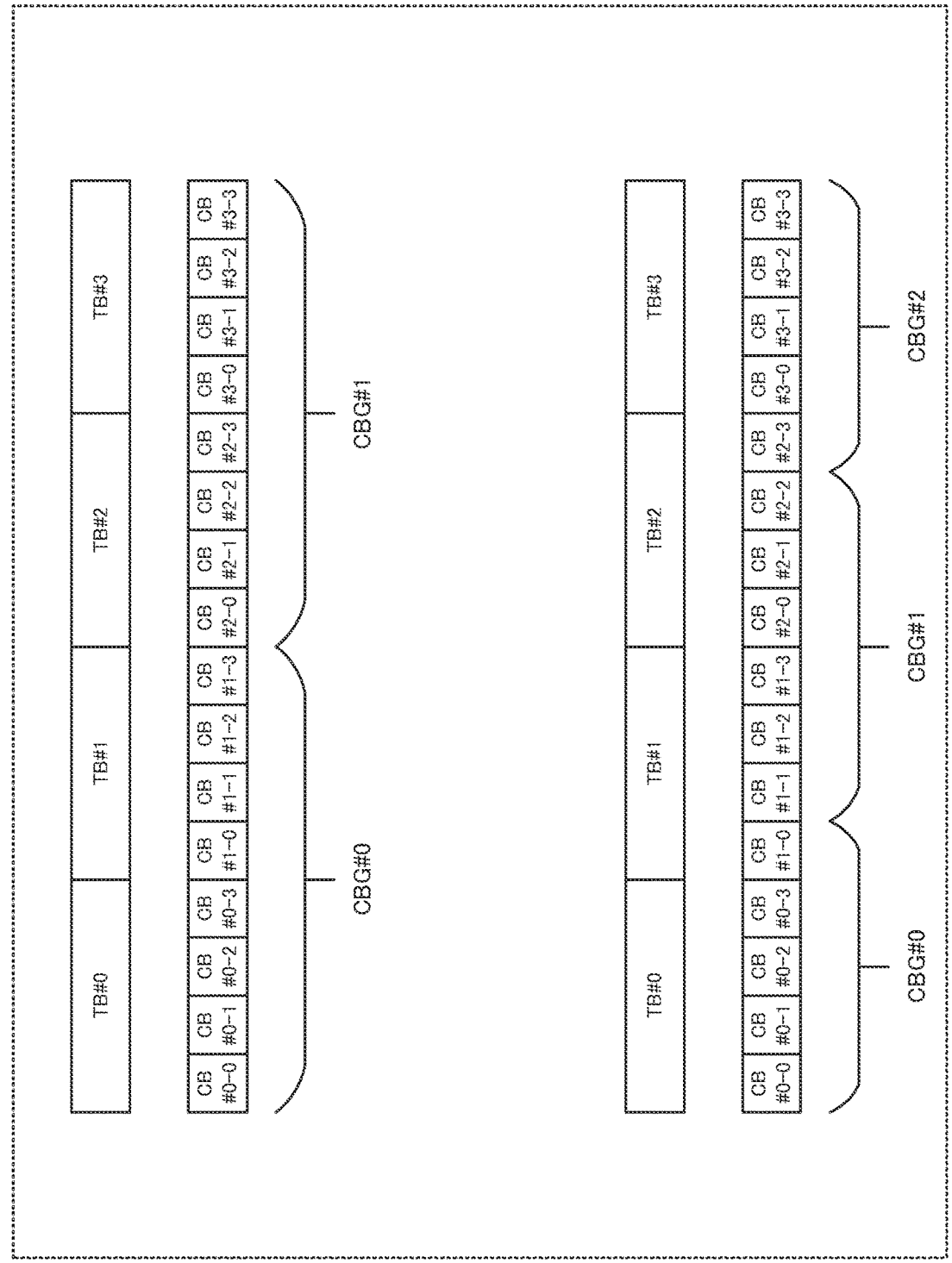
FIG. 9 illustrates still another exemplary configuration of the CBG according to Embodiment 1.

FIG. 9 illustrates an exemplary configuration of a CBG of a case where 1<M C N.

When 1<M<N, one CBG includes, for example, CBs for a plurality of TBs. In other words, one CBG may include CBs for different TBs.

For example, the upper stage of FIG. 9 illustrates an example of a case where M=2 and N=4. In the upper stage of FIG. 9, for example, one CBG may be composed of eight CBs included in two TBs. Similarly, the lower stage of FIG. 9 illustrates an example of a case where M=3 and N=4. In the lower stage of FIG. 9, for example, one CBG may be composed of five or six CBs included in two TBs.

For example, when all CBs included in a CBG are received without an error, terminal 200 may indicate the ACK to base station 100, and when an error is detected in at least one of the CBs included in the CBG, terminal 200 may indicate the NACK to base station 100.

An operation of a case where 1<M<N is equivalent to, for example, an operation of bundling response signals for the plurality of TBs, in one CBG. Moreover, for example, the operation of a case where 1<M<N is equivalent to an operation of multiplexing the response signals for the plurality of TBs (e.g., operation of including each HARQ-ACK bit in one HARQ-ACK codebook), between different CBGs.

Incidentally, as in the upper stage of FIG. 9, boundaries of CBGs and TB boundaries may be aligned with each other, or as in the lower stage of FIG. 9, the boundaries of CBGs and the TB boundaries may not be aligned. For example, as in the upper stage of FIG. 9, when the boundaries of CBGs and the TB boundaries are aligned with each other, the number of TBs, N, may be set to a value of an integral multiple of the number of CBs M as long as the number of CBs included in each TB is identical.

<Case where M=N>

Figure 10:
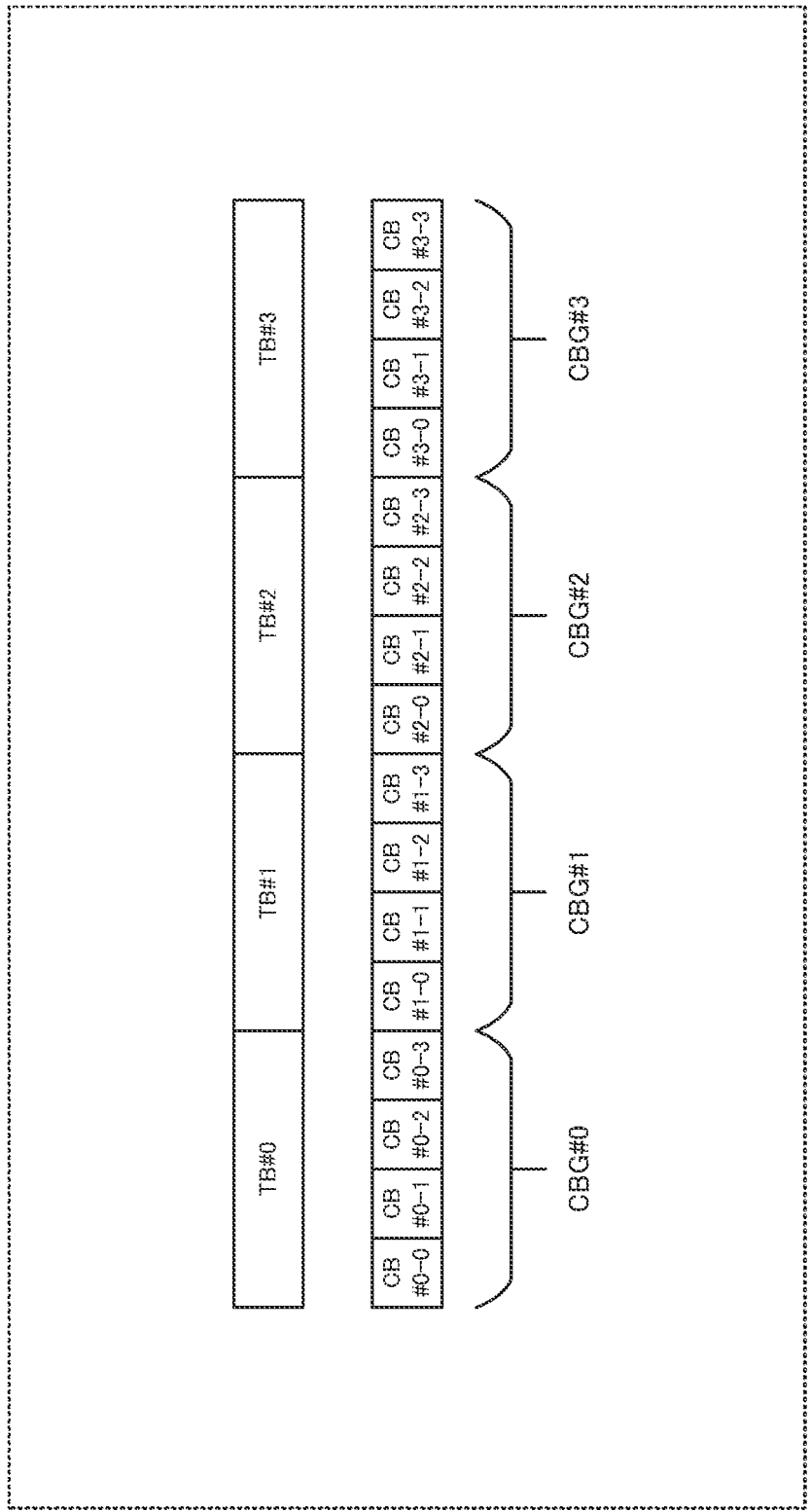
FIG. 10 illustrates still another exemplary configuration of the CBG according to Embodiment 1.

FIG. 10 illustrates an exemplary configuration of a CBG of a case where M=N. By way of example, FIG. 10 illustrates an example of a case where M=N=4. Incidentally, FIG. 10 illustrates an example in which the number of CBs included in each TB is identical.

In a case where M=N, one CBG may include, for example, CBs for each TB. In the example illustrated in FIG. 10, one CBG may be composed of four CBs included in each TB.

For example, when all CBs included in a CBG are received without an error, terminal 200 may indicate the ACK to base station 100, and when an error is detected in at least one of the CBs included in the CBG, terminal 200 may indicate the NACK to base station 100.

An operation of a case where M=N is equivalent to, for example, an operation of multiplexing the response signals for the plurality of TBs (e.g., operation of including each HARQ-ACK bit in one HARQ-ACK codebook).

<Case where N<M>

Figure 11:
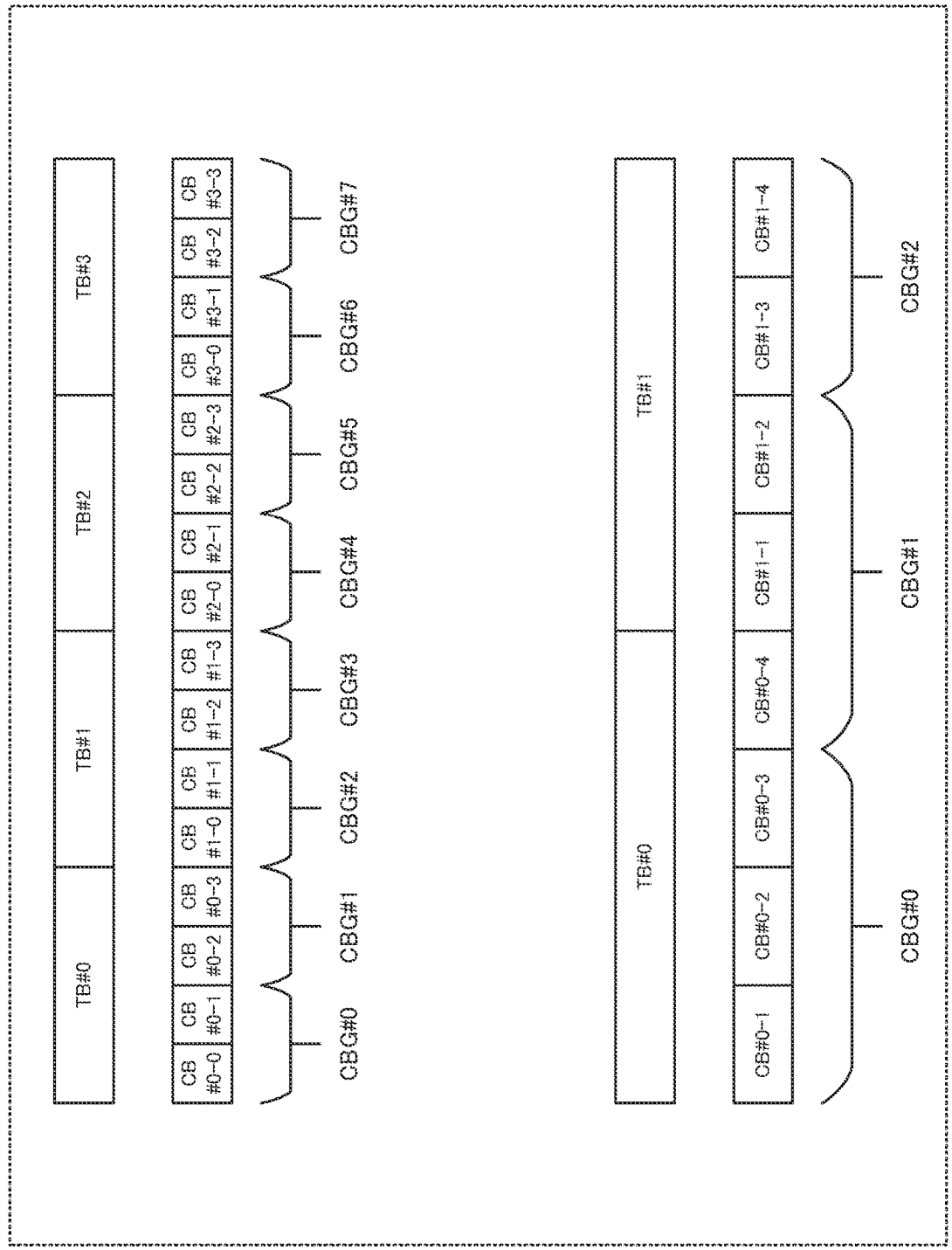
FIG. 11 illustrates yet another exemplary configuration of the CBG according to Embodiment 1.

FIG. 11 illustrates an exemplary configuration of a CBG of a case where N<M. For example, the upper stage of FIG. 11 illustrates an example of a case where N=4 and M=8, and the lower stage of FIG. 11 illustrates an example of a case where N=2 and M=3.

In a case where N<M, a plurality of CBs included in one TB may be included in different CBGs. For example, in the upper stage of FIG. 11, four CBs for one TB may be included in either of two CBGs. Similarly, for example, in the lower stage of FIG. 11, four CBs for one TB may be included in either of two CBGs.

For example, when all CBs included in a CBG are received without an error, terminal 200 indicates the ACK to base station 100, and when an error is detected in at least one of the CBs included in the CBG, terminal 200 indicates the NACK to base station 100. This allows the CBG-based (i.e., in smaller unit than TB size) retransmission control for one TB.

Here, as illustrated in the upper stage of FIG. 11, each CBG may be composed of CBs for one TB. In other words, as in the upper stage of FIG. 11, a CBG may be configured within (closed) in one TB. Alternatively, as in the lower stage of FIG. 11, each CBG may be configured over a plurality of TBs. In one example, in a case where a CBG is composed of CBs for one TB as in the upper stage of FIG. 11, the number of CBGs. M, may be set to a value of an integral multiple of the number of TBs, N, as long as the number of CBs included in each TB is identical.

The relation between the number of assigned TBs, N, the number of CBGs M, and the number of CBs, $C_n$, (n=0 to N−1) in each TB has been described thus far.

Thus, for example, depending on the number of CBGs, M, the ACK/NACK bundling, the ACK/NACK multiplexing, and the CBG-based retransmission control can be flexibly configured for the multiple-TB scheduling.

Incidentally, for example, terminal 200 may determine a method for the retransmission control (e.g., ACK/NACK bundling, ACK/NACK multiplexing, and CBG-based retransmission control) based on, for example, an indication of the number of CBGs, M. Alternatively, the respective methods for the retransmission control may be explicitly indicated to terminal 200. In that case, a value of the number of CBGs. M, corresponding to each retransmission control method may be set. For example, M=1 may be set in a case where the ACK/NACK bundling is explicitly indicated, M=N may be set in a case where the ACK/NACK multiplexing is explicitly indicated, and a value of M satisfying 1<M<N or N<M may be set in a case where the CBG-based retransmission control is explicitly indicated.

Meanwhile, the response signal (e.g., ACK/NACK or HARQ-ACK) may be transmitted via, for example, an uplink control channel (e.g., PUCCH) or may be transmitted on a PUSCH resource when a PUCCH resource overlaps with the PUSCH resource in time. For example, terminal 200 may transmit a response signal in units of a plurality of TBs in a common (e.g., identical) uplink resource (e.g., PUCCH resource or PUSCH resource).

Further, the PUCCH resource for transmitting the response signal can be controlled by, for example, the DCI including a PUCCH resource indication (PRI: PUCCH Resource Indicator). Further, the PUCCH resource for transmitting the response signal can be controlled by, for example, the DCI including a PUCCH resource indication (PRI: PUCCH Resource Indicator). Terminal 200 may determine the retransmission control method and the number of HARQ-ACK bits for the multiple-TB scheduling, based on, for example, the number of assigned TBs, N, the number of CBGs, M, and the number of CBs, $C_n$, (n=0 to N−1) in each TB. The number of HARQ-ACK bits may be M bits, for example, in the case of the number of CBGs, M.

Further, as for identifying the PUCCH resource for transmitting an HARQ-ACK bit sequence for the multiple-TB scheduling, a method of indicating a PUCCH resource to be used by terminal 200 among a plurality of PUCCH resources (e.g., candidates) included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

Further, for example, in a case where the number of PUCCH resources included in the PUCCH resource set is greater than a threshold value (e.g., eight), the PUCCH resources may be controlled using, in addition to the PRI field of the DCI, information on a Control Channel Element (CCE), which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., Physical Resource Block (PRB) number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Figure 12:
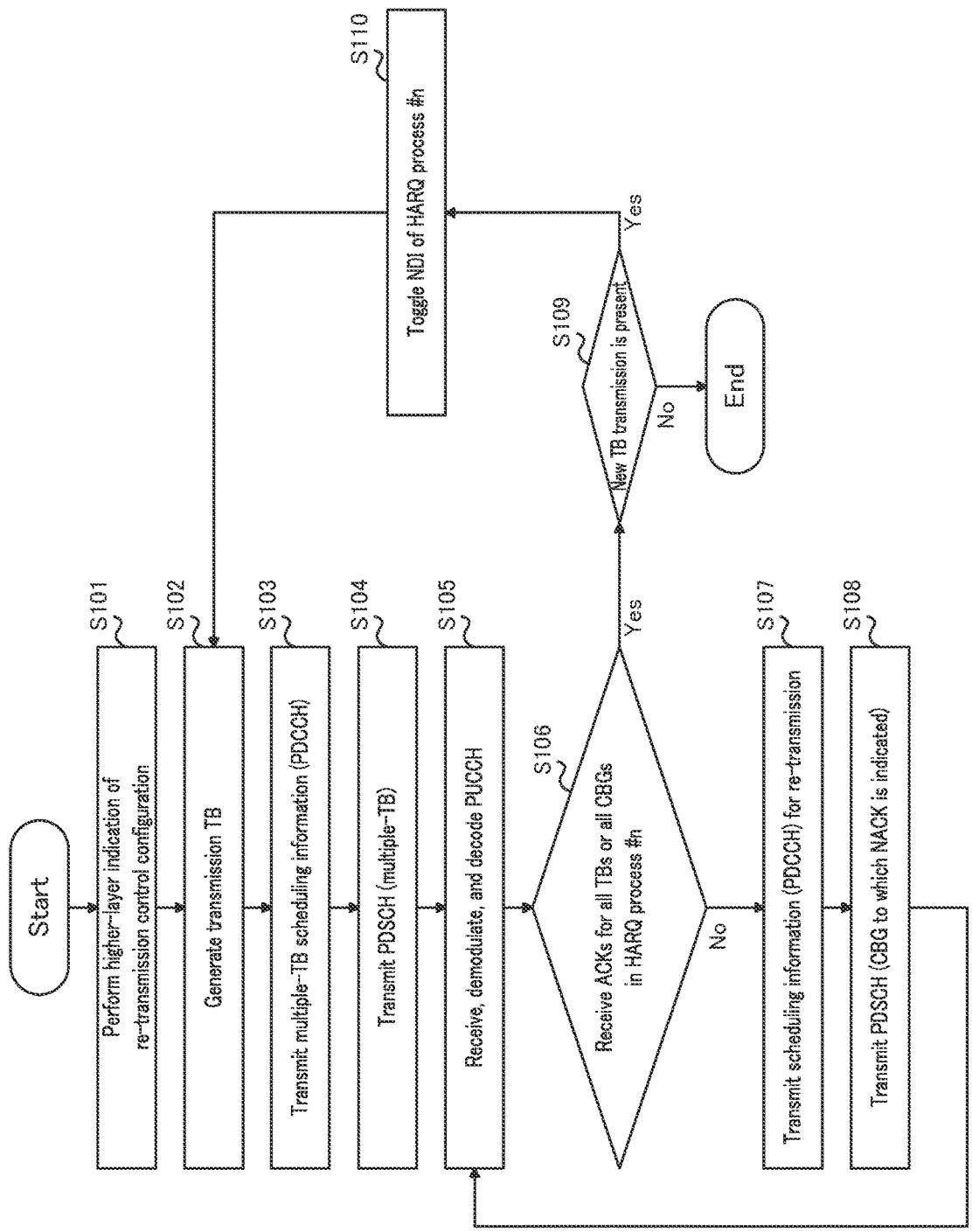
FIG. 12 is a flowchart illustrating an exemplary operation of a base station according to Embodiment 1.

FIG. 12 is a flowchart illustrating an exemplary operation related to transmission and retransmission control of/for a downlink signal (e.g., PDSCH) at base station 100 according to the present embodiment.

Base station 100 may, for example, indicate, to terminal 200, information on a configuration on the retransmission control by a higher layer (S101). The information on the configuration on the retransmission control may include, for example, information on the number of CBGs or information on a PUCCH resource.

Base station 100 may, for example, generate a TB to be transmitted (S102). Base station 100 may, for example, transmit information on multiple-TB scheduling for a plurality of generated TBs to terminal 200 (S103). The information on the multiple-TB scheduling may be transmitted via, for example, PDCCH (e.g., DCI).

Base station 100 may, for example, transmit, to terminal 200, the PDSCH including the plurality of TBs assigned by the multiple-TB scheduling (S104).

Base station 100 may, for example, receive a PUCCH (or PUSCH) transmitted from terminal 200 and perform demodulation and decoding (S105). The PUCCH may include, for example, a response signal for the PDSCH transmitted with the multiple-TB scheduling.

Base station 100 may, for example, determine whether ACKs for all TBs or all CBGs have been received in a certain HARQ process (e.g., HARQ process #n) (S106).

In a case where the ACKs for all TBs or all CBGs have not received in HARQ process #n (S106: No), base station 100 may transmit, to terminal 200, scheduling information for retransmission of the PDSCH (S107). The scheduling information may be transmitted via, for example, PDCCH (e.g., DCI). In addition, base station 100 may, for example, transmit (i.e., re-transmit) a PDSCH corresponding to the CBG to which the NACK has been indicated (S108).

Base station 100 may, for example, repeat the processing in S105 to S108 until the ACKs for all TBs or all CBGs are received in HARQ process #n or until a specified (or configured) number of times of retransmission.

On the other hand, in a case where the ACK for all TBs or all CBGs have received in HARQ process #n (S106: Yes), base station 100, for example, determines whether new TB transmission is present (S109). When the new TB transmission is present (S109: Yes), base station 100 may, for example, toggle an NDI in HARQ process #n (S110) and perform the processing in S102. When the new TB transmission is not present (S109: No), base station 100 may terminate the processing illustrated in FIG. 12.

Figure 13:
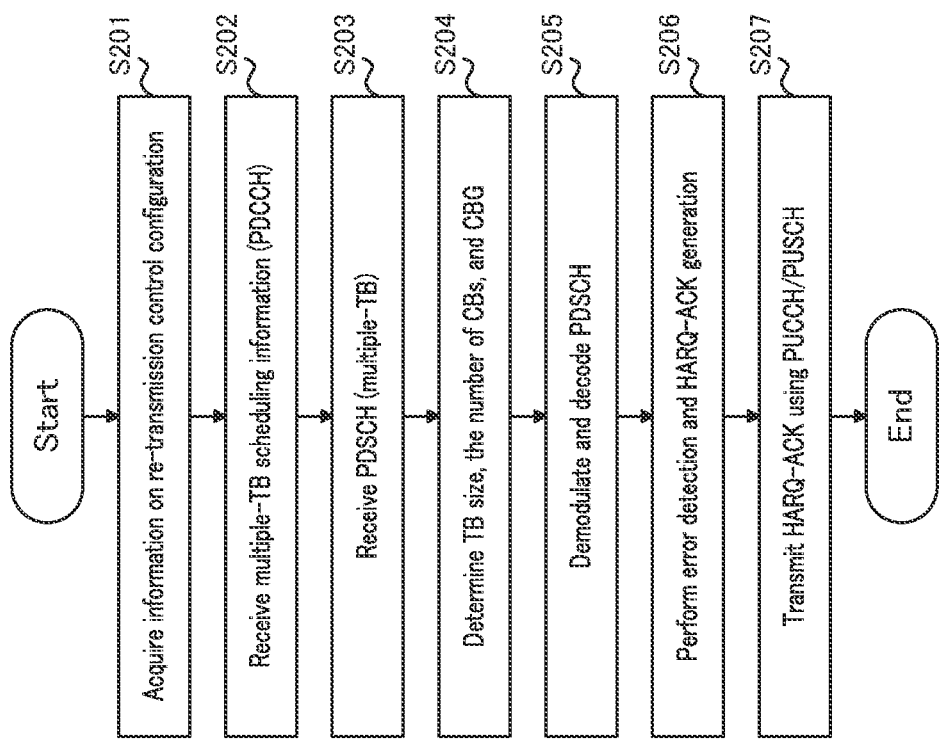
FIG. 13 is a flowchart illustrating an exemplary operation of a terminal according to Embodiment 1.

FIG. 13 is a flowchart illustrating an exemplary operation related to reception and retransmission control of/for a downlink signal at terminal 200 according to the present embodiment.

Terminal 200 may, for example, acquire information on a configuration on the retransmission control (S201). The information on configuration on the retransmission control may be indicated by, for example, a higher layer.

Terminal 200 may, for example, receive a PDCCH (e.g., DCI) including information on multiple-TB scheduling (S202). Terminal 200 may also receive a PDSCH including a plurality of TBs based on, for example, the received information on the multiple-TB scheduling (S203).

Terminal 200 may, for example, determine a TB size, the number of CBs, and a CBG (e.g., the number of CBGs and CBG size) for a plurality of assigned TBs, based on the information on the multiple-TB scheduling (S204). Terminal 200 may then, for example, perform demodulation and decoding on the received PDSCH (S205).

Terminal 200 may, for example, perform error detection for the PDSCH and, based on an error detection result, generate HARQ-ACK (e.g., ACK or NACK) (S206). For example, terminal 200 may generate HARQ-ACK for each determined CBG.

Terminal 200 may transmit the generated HARQ-ACK to base station 100 in, for example, a PUCCH or a PUSCH (S207).

The exemplary operations of base station 100 and terminal 200 have been described thus far.

According to the present embodiment, base station 100 and terminal 200 execute retransmission control for a plurality of multiple-TB scheduled TBs, in units of CBGs each including at least one CB in any one or more of the plurality of TBs, and then perform communication according to the retransmission control. In the present embodiment, for example, the number of CBs included in a CBG (e.g., CBG size) is determined based on the number of the plurality of TBs. N, the number of CBGs, M, in the plurality of TBs, and the number of CBs, $C_n$, included in each TB #n.

This enables, in the multiple-TB scheduling, terminal 200 to determine the number of HARQ-ACK bits in the multiple-TB scheduling based on, for example, the number of CBGs, the number of assigned TBs, and the number of CBs in each TB. Further, in the present embodiment, for example, even in the multiple-TB scheduling, the PUCCH resource control in NR can be repurposed. Therefore, according to the present embodiment, the CBG based retransmission control can be appropriately executed in the multiple-TB scheduling.

Variation of Embodiment 1

In Embodiment 1, for example, a case has been described where the number of CBs included in a CBG is determined based on the number of CBGs, the number of assigned TBs, and the number of CBs in each TB, in the multiple-TB scheduling.

For example, as mentioned above, the size of TB received by terminal 200 in PDSCH may be determined based on the MCS of each PDSCH, the time resource amount, and the frequency resource amount, and thus, the number of CBs may be determined based on the TB size.

In addition, the number of assigned TBs may be, for example, semi-statically indicated to terminal 200 by the higher layer (e.g., RRC signal) or dynamically indicated by the DCI for assigning a PDSCH that transmits each TB. In a case where the number of assigned TBs is dynamically indicated by the DCI, for example, a bit field for indicating the number of TBs may be independently configured in the DCI, or the number of TBs may be indicated together with a time domain resource in a TDRA field for indicating the time domain resource for the DCI.

Moreover, the number of CBGs or the largest number of CBGs may be, for example, semi-statically indicated to terminal 200 by the higher layer (e.g., RRC signal) or dynamically indicated by the DCI for assigning a PDSCH that transmits each TB. In a case where the number of CBGs or the largest number of CBGs is dynamically indicated by the DCI, for example, a bit field for indicating the number of CBGs or the largest number of CBGs may be independently configured in the DCI, or the number of CBGs or the largest number of CBGs may be indicated together with a time domain resource in a TDRA field for indicating the time domain resource for the DCI. Alternatively, the number of CBGs or the largest number of CBGs may be indicated together with the bit field for indicating the number of TBs, for example.

Further, terminal 200 may, for example, determine the number of CBGs or the largest number of CBGs based on the number of assigned TBs. In one example, when the number of CBGs or the largest number of CBGs per TB is indicated to terminal 200, terminal 200 may set the number of CBGs or the largest number of CBGs for the multiple-TB scheduling to a multiplication value of the number of CBGs or the largest number of CBGs per TB and the number of assigned TBs.

As mentioned above, when the number of CBGs for the multiple-TB scheduling or the number of CBGs per TB is determined, as the number of CBs increases, the number of CBGs included in one CBG decreases.

Meanwhile, for example, the number of CBs included in one CBG may be fixed. In this case, terminal 200 may, for example, determine the number of CBs based on the number of assigned TBs, N, and the number of CBs, $C_n$, (n=0 to N−1) in each TB and thus determine the retransmission control method and the number of HARQ-ACK bits for the multiple-TB scheduling. In this situation, as the number of assigned TBs, N, and the number of CBs, $C_n$, (n=0 to N−1) in each TB increase, the number of CBGs also increases.

Embodiment 2

Configurations of base station 100 and terminal 200 according to the present embodiment may be, for example, the same as the configurations in Embodiment 1.

In Embodiment 1, a case has been described where a common (e.g., identical) HARQ process number may be assigned to a plurality of TBs. In the present embodiment, for example, a description will be given of a case where a different HARQ process number is assigned in units of a plurality of TB.

A transmission side (e.g., base station 100) may apply, to each TB (e.g., N>1), processing such as CB segmentation, encoding per CB, Rate matching, CB concatenation, scrambling, and data-modulation, for example.

Meanwhile, DCI including scheduling information such as resource allocation from base station 100 may be transmitted to terminal 200 via PDCCH, for example. Terminal 200 may receive a PDSCH according to the resource allocation indicated by the DCI on the PDCCH, for example. In the multiple-TB scheduling, for example, a plurality of PDSCHs may be assigned to different time- or frequency-resources by one DCI. Further, each PDSCH may include, for example, a different TB. In other words, a plurality of TBs received in different time- or frequency-resources can be scheduled by one DCI. Incidentally, the MCS of the PDSCH assigned for each TB, the time resource amount (e.g., the number of symbols), or the frequency resource amount (e.g., the number of resource blocks) may be different from each other, or at least one of them may be common (e.g., identical) between TBs.

Terminal 200 may, for example, determine the size of TB received via PDSCH based on the MCS of each PDSCH, the time-resource amount, and the frequency-resource amount, and thus determine the number of CBs based on the TB size. In addition, terminal 200 may, for example, decode each CB and perform error detection in each CB by using the CB-CRC bit added to each CB. Further, when the CB segmentation is used, terminal 200 may restore a TB and perform error detection in the entire TB by using the TB-CRC added to the TB.

In the present embodiment, terminal 200 may control retransmission for each of the plurality of TBs assigned by the multiple-TB scheduling, for example.

For example, in a case where no CBG-based retransmission is configured for terminal 200 (e.g., no higher layer parameter "PDSCH-CodeBlockGroupTransmission" is configured), terminal 200 may transmit for each TB, to base station 100, a response signal (e.g., ACK/NACK or HARQ-ACK) for the entire TB, according to an error detection result in the entire TB. Base station 100 may, for example, retransmit the entire TB to the TB to which the NACK is indicated from terminal 200.

Further, for example, in a case where the CBG-based retransmission is configured for terminal 200 (e.g., higher layer parameter "PDSCH-CodeBlockGroupTransmission" is configured), terminal 200 may execute the retransmission control in units of CBGs. For example, terminal 200 may transmit for each TB, to base station 100, a response signal (e.g., ACK/NACK or HARQ-ACK) for the CBG, according to an error detection result for the CBG. By way of example, terminal 200 may indicate, to base station 100, the ACK when all CBs included in the CBG are received without an error, and indicate, to base station 100, the NACK when an error is detected in at least one of CBs included in the CBG. Base station 100 may, for example, re-transmit the CBG to which the NACK has been indicated from terminal 200.

For example, in the present embodiment, as a parameter relating to the CBG-based retransmission, the number of CBs "M" in a plurality (e.g., N pieces) TBs may be set to terminal 200. Terminal 200 may determine the number of CBs included in a CBG, based on the number of CBGs, M, for each of N pieces of TBs, and the number of CBs "Cn" (n=0 to N−1) included in for each of N pieces of TBs, for example.

Further, in the present embodiment, for example, regardless of whether each TB is divided into a plurality of CBs, an HARQ process different for each multiple-TB scheduled TB may be assigned. For example, in the identical HARQ process number, data may be re-transmitted until an ACK is received for a TB or all CBGs.

The retransmission can be controlled by, for example, the DCI including the HARQ process number, the NDI, and the RV. Meanwhile, the CBG-based retransmission can be controlled by, for example, the DCI including the CBGTI and the CBGFI.

For example, in a case where the NDI is not toggled (e.g., case of retransmission) in the identical HARQ process, the CBGTI may indicate a CBG to be re-transmitted. Further, the CBGFI may be, for example, a notification indicating whether the re-transmitted CBG can be combined with the previously transmitted CBG.

According to the present embodiment, the retransmission control independent for each TB to be multiple scheduled can be applied. For example, in the multiple-TB scheduling, base station 100 may transmit the TB for the initial transmission together with the TB for the retransmission. Thus, according to the present embodiment, more flexible downlink transmission can be achieved, which can improve downlink transmission efficiency.

The response signal (e.g., ACK/NACK or HARQ-ACK) may be transmitted via, for example, an uplink control channel (e.g., PUCCH) or may be transmitted on a PUSCH resource when a PUCCH resource overlaps with the PUSCH resource in time.

Further, the PUCCH resource for transmitting the response signal can be controlled by, for example, the DCI including a PRI. As for identifying the PUCCH resource for transmitting an HARQ-ACK bit for the multiple-TB scheduling, for example, terminal 200 may apply any of the following Options 1 to 5.

<Option 1: ACK/NACK Bundling and Single PUCCH Resource>

In Option 1, terminal 200 may, for example, transmit a response signal that is based on an error detection result in all of the plurality of TBs, in one PUCCH resource. For example, terminal 200 may generate ACK when receiving all TBs in the multiple-TB scheduling without an error, and may generate NACK when an error is detected in at least one of the plurality of TBs in the multiple-TB scheduling. That is, in Option 1, for example, the number of HARQ-ACK bits for the multiple-TB scheduling is one bit.

As for identifying the PUCCH resource for transmitting an HARQ-ACK bit for the multiple-TB scheduling, a method of indicating a PUCCH resource to be used by terminal 200 among a plurality of PUCCH resources included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

Further, for example, in a case where the number of PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Figure 14:
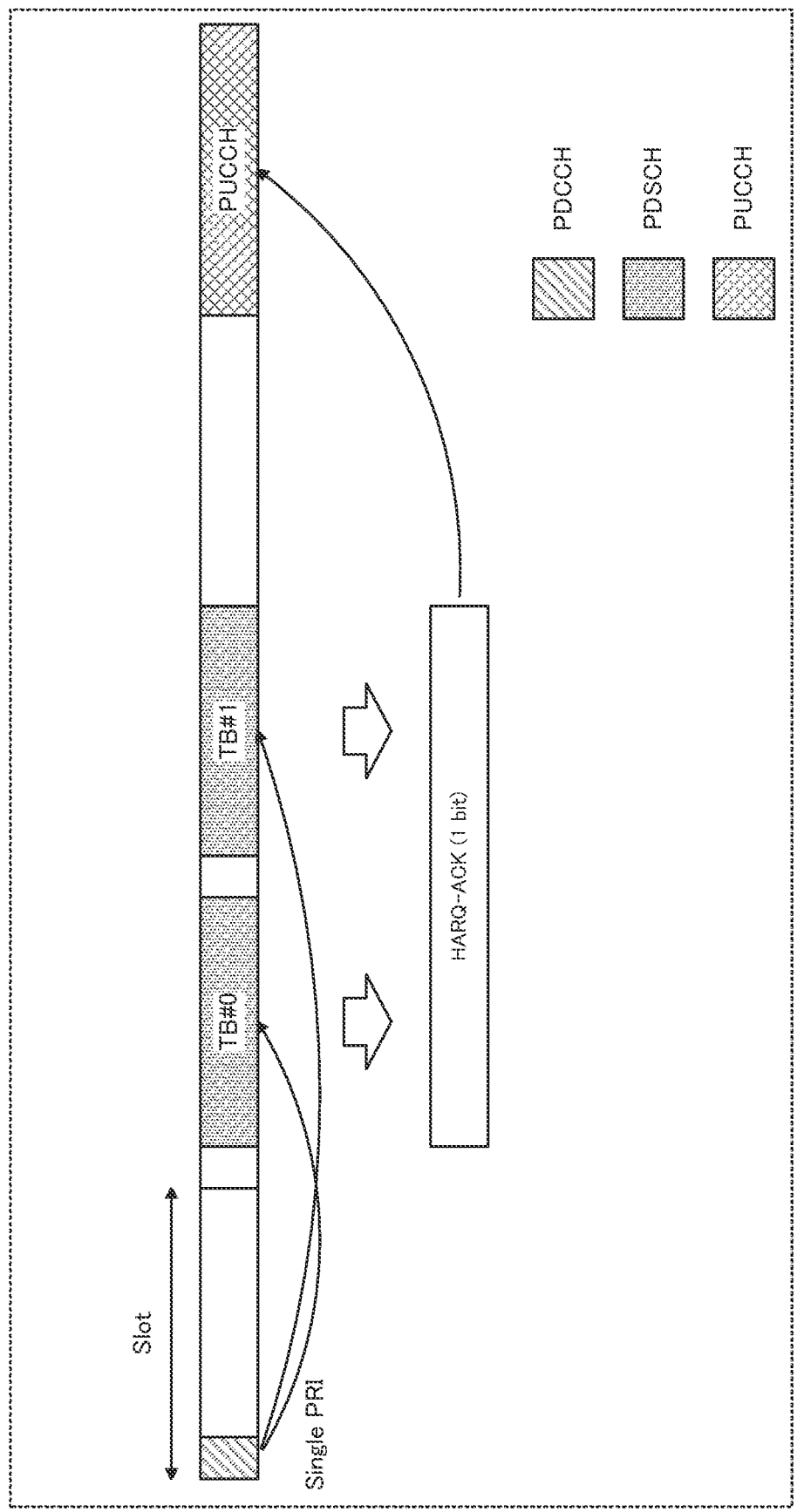
FIG. 14 illustrates a configuration example of a Physical Uplink Control Channel (PUCCH) resource according to Embodiment 2.

FIG. 14 illustrates an exemplary PUCCH resource that transmits an HARQ-ACK according to Option 1. In FIG. 14, as an example, the number of assigned TBs, N, by the multiple-TB scheduling is 2. As illustrated in FIG. 14, terminal 200 may generate an one-bit HARQ-ACK based on error detection results in TB #0 and TB #1 of N=2 TBs. Terminal 200 may, for example, transmit the generated HARQ-ACK to base station 100 via PUCCH.

In Option 1, for example, the HARQ-ACK corresponding to the error detection results in all of the plurality of TBs assigned by the multiple-TB scheduling is transmitted, and thus, the number of HARQ-ACK bits and the number of PUCCH resources can be reduced. For example, in Option 1, an overhead related to the indication of the PRI in the multiple-TB scheduling can be suppressed to almost the same amount as that in NR (or when scheduling one TB).

<Option 2: ACK/NACK Multiplexing and Single PUCCH Resource>

In Option 2, terminal 200 may, for example, transmit a signal obtained by multiplexing response signals that are based on error detection results in units of a plurality of TBs, in one PUCCH resource.

For example, terminal 200 may determine the number of HARQ-ACK bits based on the number of CBGs, M, for each TB in the multiple-TB scheduling and the number of CBGs $C_n$ (n=0 to N−1) in each TB. For example, in the case of the number of CBGs, M, for each TB, the number of HARQ-ACK bits may be M bits. Further, terminal 200 may, for example, multiplex the response signals for the plurality of TBs. In other words, terminal 200 may include HARQ-ACK bit sequences for the respective TBs in one HARQ-ACK codebook.

Hence, the number of HARQ-ACK bits of the number of assigned TBs, N, for the multiple-TB scheduling may be M×N bits.

Further, similar to Option 1, as for identifying the PUCCH resource for transmitting an HARQ-ACK bit for the multiple-TB scheduling, a method of indicating a PUCCH resource to be used by terminal 200 among a plurality of PUCCH resources included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

Further, for example, in a case where the number of PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Figure 15:
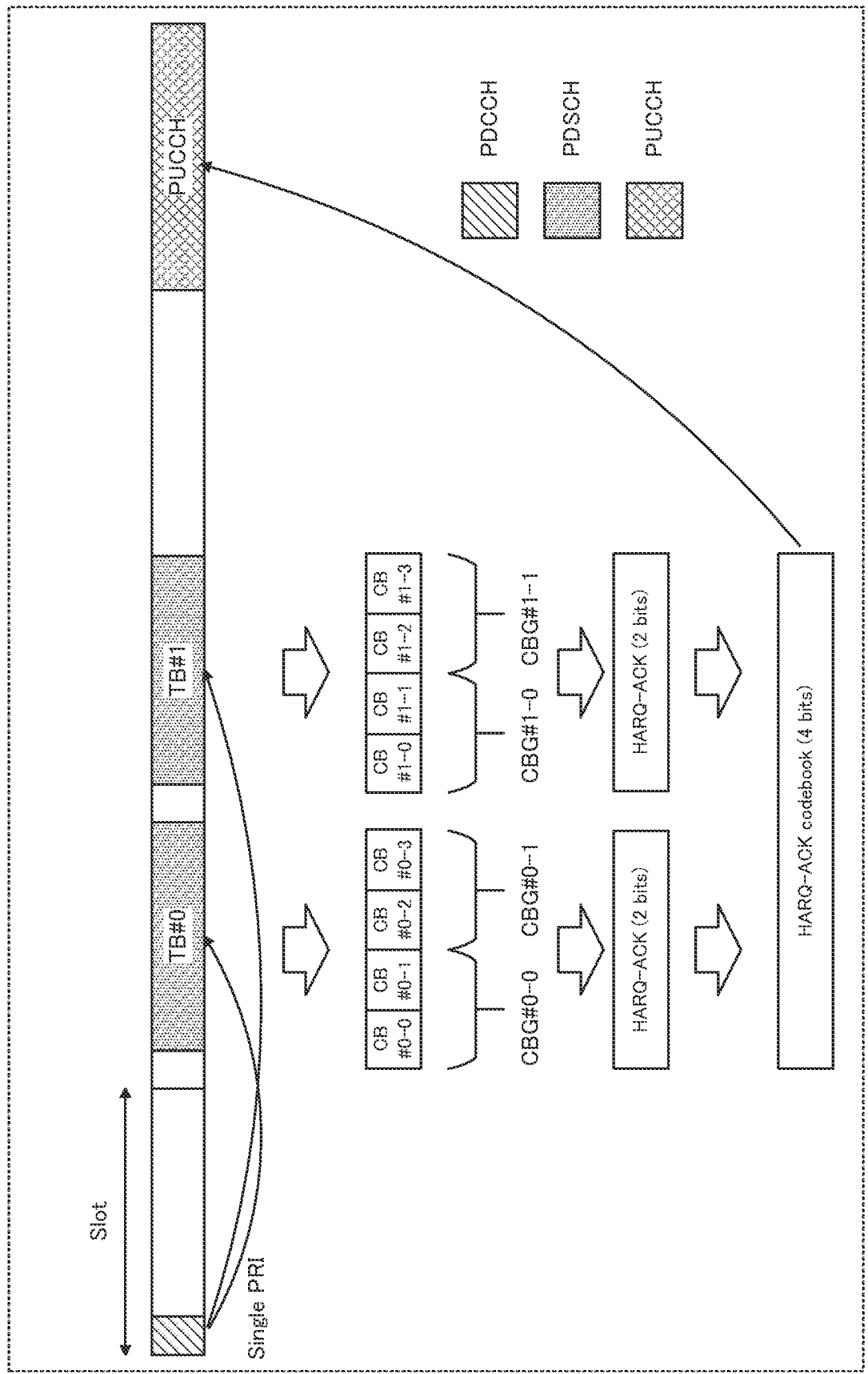
FIG. 15 illustrates another configuration example of the PUCCH resource according to Embodiment 2.

FIG. 15 illustrates an exemplary PUCCH resource that transmits an HARQ-ACK according to Option 2. In FIG. 15, as an example, the number of assigned TBs, N, by the multiple-TB scheduling is 2, and the number of CBGs, M, in each TB is 2. As illustrated in FIG. 15, terminal 200 may multiplex two-bit HARQ-ACK bit sequences two-bit HARQ-ACK bit sequences each based on an error detection result of the respective CBGs of M=2 CBGs (e.g., error detection results of four CBGs) in each of TB #0 and TB #1 of N=2 TBs, and may thereby generate a four-bit HARQ-ACK codebook. Terminal 200 may, for example, transmit the generated HARQ-ACK codebook to base station 100 via PUCCH.

In Option 2, for example, the HARQ-ACK for the plurality of TBs assigned by the multiple-TB scheduling is transmitted in one PUCCH resource, and thus, the number of HARQ-ACK bits and the number of PUCCH resources can be reduced. For example, in Option 2, an overhead related to the indication of the PRI in the multiple-TB scheduling can be suppressed to almost the same amount as that in NR (or when scheduling one TB). Additionally, in Option 2, the CBG-based retransmission control per TB is possible.

<Option 3: Multiple PUCCH Resources and Multiple PRIs>

In Option 3, terminal 200 may, for example, transmit response signals that are based on error detection results in units of a plurality of TBs, in a plurality of PUCCH resources. Further, in Option 3, terminal 200 may, for example, receive a plurality of PRIs (i.e., a plurality of information sets) indicating the plurality of PUCCH resources.

For example, terminal 200 may determine the number of HARQ-ACK bits based on the number of CBGs, M, for each TB in the multiple-TB scheduling and the number of CBGs Cn (n=0 to N−1) in each TB. For example, in the case of the number of CBGs, M, for each TB, the number of HARQ-ACK bits may be M bits. Further, terminal 200 may, for example, transmit HARQ-ACK bit sequences for the respective TBs in different PUCCH resources.

Further, similar to Option 1, as for identifying the PUCCH resource for transmitting an HARQ-ACK bit for the multiple-TB scheduling, a method of indicating a PUCCH resource to be used by terminal 200 among a plurality of PUCCH resources included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

In a Option 3, for example, DCI may include a plurality of PRI fields. For example, each PRI field may include information indicating a PUCCH resource that transmits an HARQ-ACK bit sequence for each of the plurality of multiple-TB scheduled TBs.

Further, for example, in a case where the number of PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Figure 16:
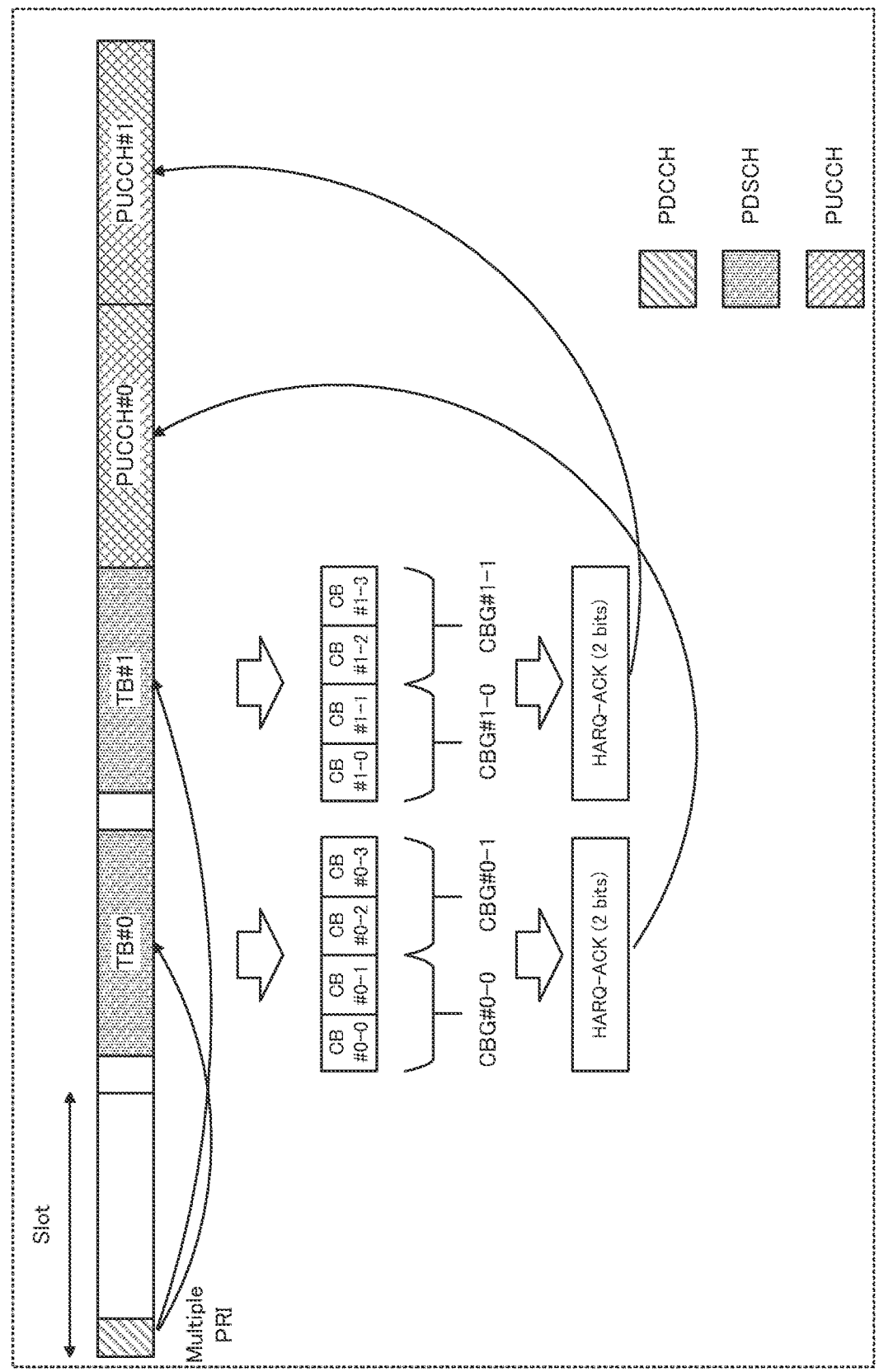
FIG. 16 illustrates still another configuration example of the PUCCH resource according to Embodiment 2.

FIG. 16 illustrates an exemplary PUCCH resource that transmits an HARQ-ACK according to Option 3. In FIG. 16, as an example, the number of assigned TBs, N, by the multiple-TB scheduling is 2, and the number of CBGs, M, in each TB is 2. Further, in FIG. 16, HARQ-ACK bit sequences for the TBs of N=2 TBs may be transmitted with two PUCCH resources #0 and #1.

As illustrated in FIG. 16, terminal 200 may generate, in each of TB #0 and TB #1 of N=2 TBs, a two-bit HARQ-ACK bit sequence based on an error detection results of the respective CBGs of M=2 CBGs. Terminal 200 may then transmit the generated HARQ-ACK bit sequence to base station 100, in PUCCH resource #0 and #1 respectively corresponding to TB #0 and TB #1, for example.

In Option 3, since terminal 200 can transmit an HARQ-ACK in PUCCH different for each TB, decoding of TBs and transmission of PUCCHs can be performed sequentially from the received TB, for example. For example, the delay of the TB transmitted in the earlier slot in time can be reduced. Further, in Option 3, having a plurality of PRIs allows flexible PUCCH resource allocation for each TB.

<Option 4: Multiple PUCCH Resources and Single PRI (RRC Table)>

In Option 4, terminal 200 may, for example, transmit a response signal that is based on an error detection result of each of a plurality of TBs, in a plurality of PUCCH resources. Further, in Option 4, terminal 200 may, for example, receive information (e.g., PRI) indicating a combination of the plurality of PUCCH resources.

For example, terminal 200 may determine the number of HARQ-ACK bits based on the number of CBGs, M, for each TB in the multiple-TB scheduling and the number of CBGs Cn (n=0 to N−1) in each TB. For example, in the case of the number of CBGs, M, for each TB, the number of HARQ-ACK bits may be M bits. Further, terminal 200 may, for example, transmit HARQ-ACK bit sequences for the respective TBs in different PUCCH resources.

Further, similar to Option 1, as for identifying the PUCCH resource for transmitting an HARQ-ACK bit for the multiple-TB scheduling, a method of indicating a PUCCH resource to be used by terminal 200 among a plurality of PUCCH resources included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

In Option 4, for example, the PUCCH resource set that is semi-statically indicated by the higher layer may include a combination of the plurality of PUCCH resources for the multiple-TB scheduling. For example, in Option 4, the PRI field included in the DCI may be one field that indicates any combination of the plurality of PUCCH resources. By way of example, one PRI may indicate a combination of the plurality of PUCCH resources to be used in transmission of an HARQ-ACK bit sequence.

Further, for example, in a case where the number of combinations of the PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Figure 17:
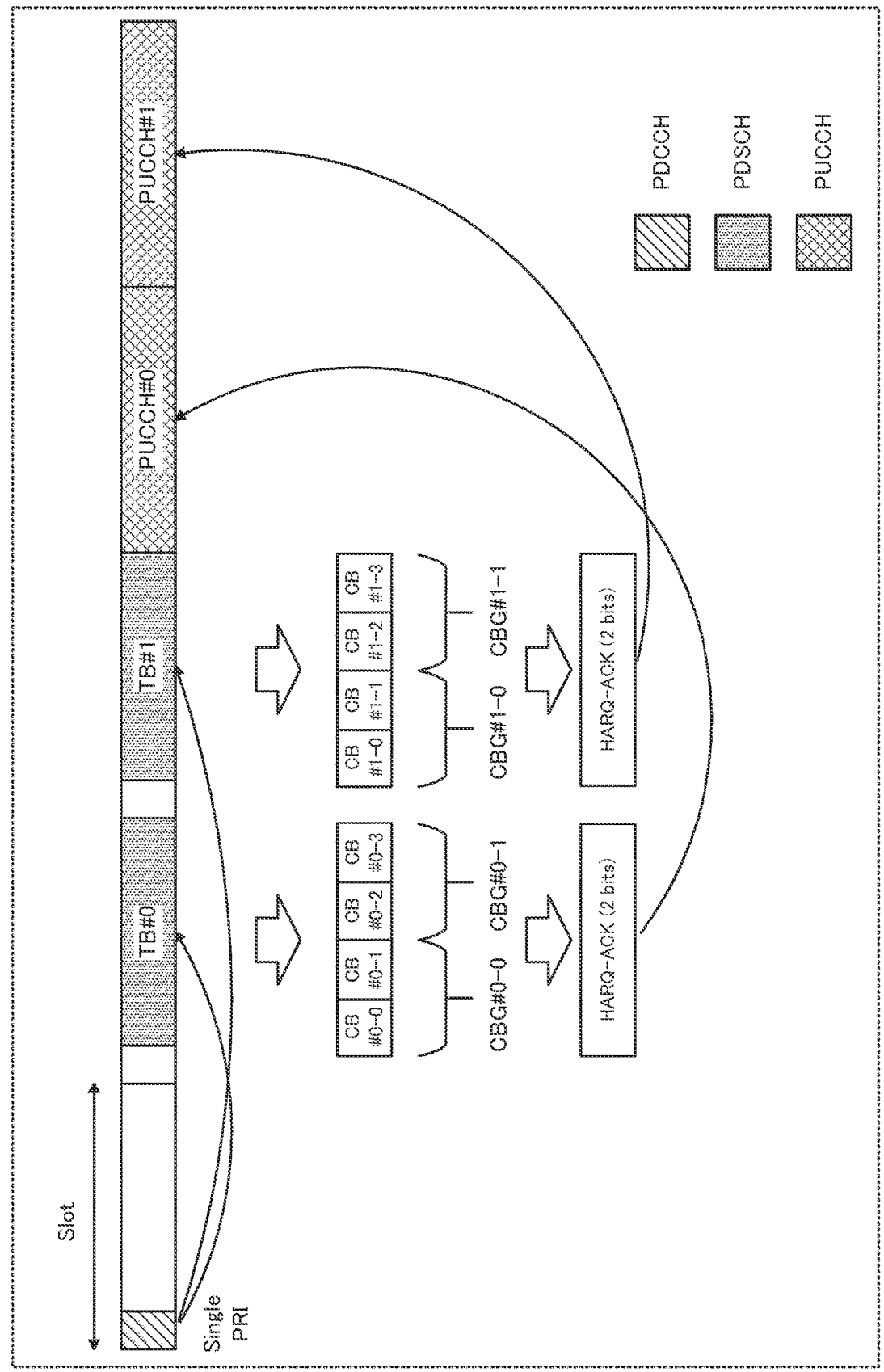
FIG. 17 illustrates still another configuration example of the PUCCH resource according to Embodiment 2.

FIG. 17 illustrates an exemplary PUCCH resource that transmits an HARQ-ACK according to Option 4. Meanwhile, FIG. 18 illustrates an exemplary association of a PRI value and a combination of the plurality of PUCCH resources.

In FIG. 17, as an example, the number of assigned TBs, N, by the multiple-TB scheduling is 2, and the number of CBGs, M, in each TB is 2. In FIG. 17, HARQ-ACK bit sequences for the TBs of N=2 TBs may be transmitted with two PUCCH resources #0 and (e.g., any of PUCCH resources #0-0 to #0-7 illustrated in FIG. 18) and PUCCH resource #1 (e.g., any of PUCCH resources #1-0 to #1-7 illustrated in FIG. 18).

As illustrated in FIG. 17, terminal 200 may generate, in TB #0 and TB #1 of N=2 TBs, respectively, a two-bit HARQ-ACK bit sequence that is based on an error detection result of the respective CBGs of M=2 CBGs. Further, terminal 200 may, for example, identify PUCCH resources #0 and #1 respectively corresponding to TB #0 and TB #1, based on the received one PRI and the association illustrated in FIG. 18, and then transmit the generated HARQ-ACK bit sequence to base station 100.

In Option 4, since terminal 200 can transmit an HARQ-ACK in PUCCH different for each TB, decoding of TBs and transmission of PUCCHs can be performed sequentially from the received TB, for example. For example, the latency of the TB transmitted in the earlier slot in time can be reduced.

Additionally, in Option 4, since a combination of a plurality of PUCCH resources is indicated by one PRI, an overhead related to the indication of the PRI in the multiple-TB scheduling can be suppressed to almost the same amount as that in NR (or when scheduling one TB), for example.

<Option 5: Multiple PUCCH Resources and Single PRI (Implicit relation)>

In Option 5, terminal 200 may, for example, transmit a response signal that is based on an error detection result of each of a plurality of TBs, in a plurality of PUCCH resources. Further, in Option 5, terminal 200 may, for example, receive information (e.g., PRI) indicating a portion of the plurality of PUCCH resources and determine, based on the portion of the plurality of PUCCH resources, another resource different from the portion of the plurality of PUCCH resources.

For example, terminal 200 may determine the number of HARQ-ACK bits based on the number of CBGs, M, for each TB in the multiple-TB scheduling and the number of CBGs Cn (n=0 to N−1) in each TB. For example, in the case of the number of CBGs, M, for each TB, the number of HARQ-ACK bits may be M bits. Further, terminal 200 may, for example, transmit HARQ-ACK bit sequences for the respective TBs in different PUCCH resources.

In Option 5, as for identifying the PUCCH resource for transmitting an HARQ-ACK bit for a portion of TBs (e.g., TB #0) in the multiple-TB scheduling, a method of indicating a PUCCH resource to be used by terminal 200 among a plurality of PUCCH resources included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

Further, for example, in a case where the number of combinations of the PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Further, in Option 5, as for identifying the PUCCH resource for transmitting an HARQ-ACK bit for a TB different from and other than the portion of TBs (e.g., TB #0) in the multiple-TB scheduling, for example, terminal 200 may implicitly identify a PUCCH resource based on the PUCCH resource for transmitting the HARQ-ACK bit sequence for TB #0.

By way of example, terminal 200 may identify, as the PUCCH resource for transmitting the HARQ-ACK bit sequence for the other TB, a PUCCH resource that is the same parameter as the PUCCH resource for transmitting the HARQ-ACK bit sequence for TB #0 and has a different slot number. Alternatively, terminal 200 may identify, as the PUCCH resource for transmitting the HARQ-ACK bit sequence for the other TB, a PUCCH resource that is the same parameter as the PUCCH resource for transmitting the HARQ-ACK bit sequence for the TB one before in time and is added a fixed offset in time. For example, the HARQ-ACK bit sequence for the other TB may be transmitted from a slot or symbol that is next to the last slot or symbol of the PUCCH resource for transmitting the HARQ-ACK bit sequence for the TB one before of the other TB.

Figure 19:
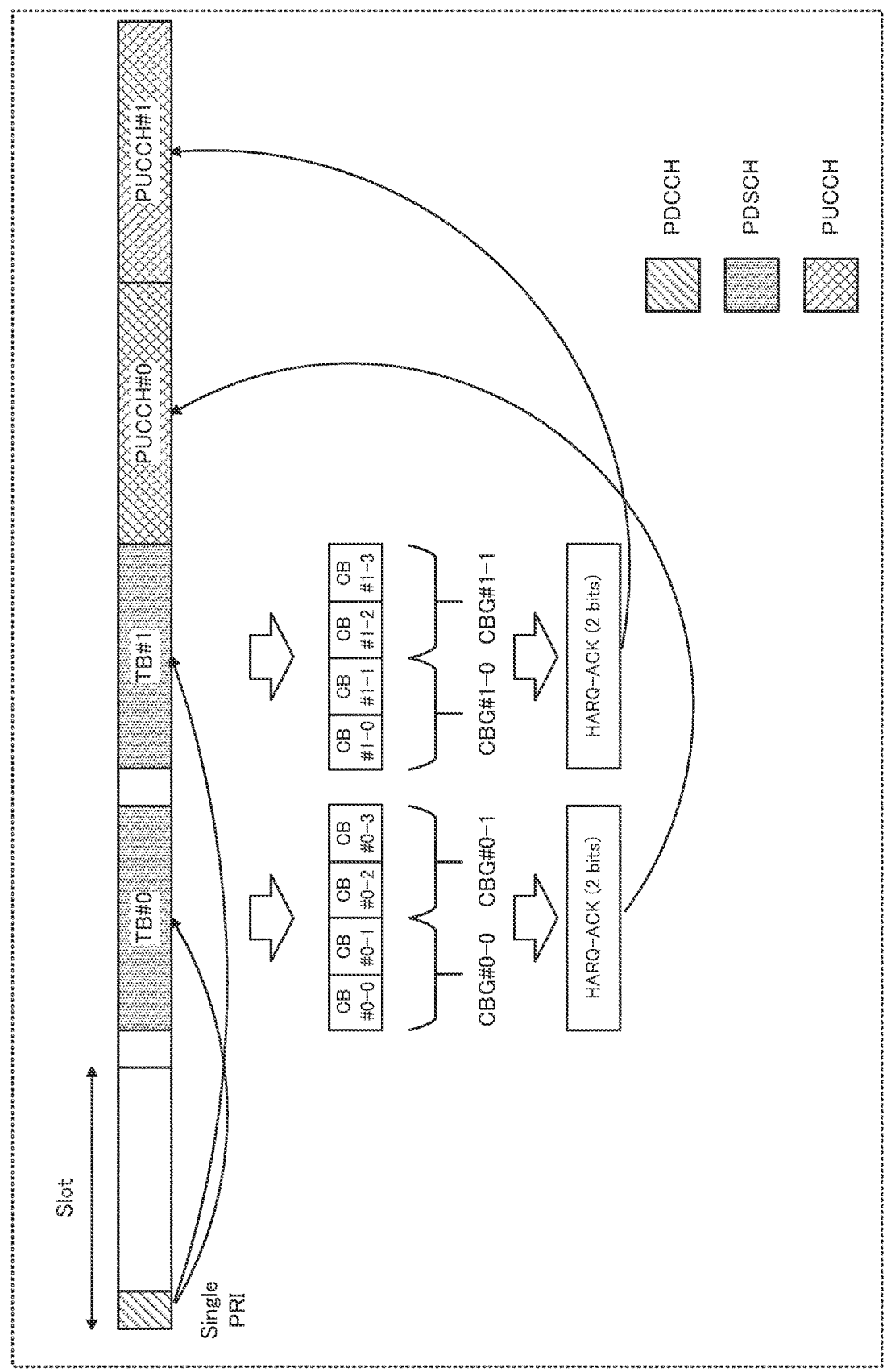
FIG. 19 illustrates yet another configuration example of the PUCCH resource according to Embodiment 2.

FIG. 19 illustrates an exemplary PUCCH resource that transmits an HARQ-ACK according to Option 5.

In FIG. 19, as an example, the number of assigned TBs, N, by the multiple-TB scheduling is 2, and the number of CBGs, M, in each TB is 2. Further, in FIG. 19, HARQ-ACK bit sequences for the TBs of N=2 TBs may be transmitted with two PUCCH resources #0 and #1.

As illustrated in FIG. 19, terminal 200 may generate, in TB #0 and TB #1 of N=2 TBs, respectively, a two-bit HARQ-ACK bit sequence that is based on an error detection result of the respective CBGs of M=2 CBGs. Moreover, terminal 200 may, for example, identify PUCCH resource #0 corresponding to TB #0, based on the received one PRI, and then transmit the generated HARQ-ACK bit sequence to base station 100. Furthermore, terminal 200 may, for example, identify PUCCH resource #1 corresponding to TB #1, based on PUCCH resource #0 that corresponds to TB #0 and is identified based on the PRI, and then transmit the generated HARQ-ACK bit sequence to base station 100.

In Option 5, since terminal 200 can transmit an HARQ-ACK in PUCCH different for each TB, decoding of TBs and transmission of PUCCHs can be performed sequentially from the received TB, for example. For example, the delay of the TB transmitted in the earlier slot in time can be reduced.

Additionally, in Option 5, since a part of the plurality of PUCCH resources is indicated by the PRI and another resource is identified based on the part of the plurality of PUCCH resources, an overhead related to the indication of the PRI in the multiple-TB scheduling can be suppressed to almost the same amount as that in NR (or when scheduling one TB), for example.

Meanwhile, for example, as compared to Option 4, an overhead of information indicated by the higher layer can be reduced in Option 5.

Option 1 to Option 5 for identifying a PUCCH resource for transmitting an HARQ-ACK bit for each TB in the multiple-TB scheduling have been each described thus far.

It should be noted that any of Option 1 to Option 5 is applied may be previously specified by standards, may be indicated to terminal 200 by a higher layer signaling or DCI, or may be previously configured in terminal 200. Further, at least two of Option 1 to Option 5 may be applied in combination.

Variation of Embodiment 2

In Embodiment 2, the description has been given of the retransmission control by the DCI including an HARQ process number, NDI, and RV which are for each of the multiple-TB scheduled TBs. In this retransmission control, for example, as the number of assigned TBs increases, an overhead of the DCI to indicate the HARQ process number, the NDI, and the RV also increases.

In the variation of Embodiment 2, a method for suppressing an increase in an overhead of the DCI will be described.

For example, with respect to the RV, the RV for each TB need not be included in the DCI. This can suppress an increase in the overhead of the DCI. For example, in the case of the initial transmission (e.g., when NDI is toggled), RV=0 may be set, and in the case of the retransmission (e.g., when NDI is not toggled in same HARQ process), an RV may be set which corresponds to the number of times of retransmission. In one example RV=3 may be set in the first retransmission, RV=2 may be set in the second retransmission, and RV=1 may be set in the third retransmission. The setting of the RV is not limited to these examples.

Meanwhile, for example, with respect to the indication of the HARQ process number, any of the following Option i to Option v may be applied.

<Option i>

In Option i, for example, HARQ process numbers assignable to the respective multiple-TB scheduled TBs may be consecutive HARQ process numbers.

By way of example, when the HARQ process number for TB #0 is "$HPN_0$," the HARQ process number for TB #n (n=0 to N−1) may be set to "$HPNn=(HPN_0+n) \bmod N_{HP}$." Where N denotes the number of assigned TBs, and $N_{HP}$ denotes the largest number of HARQ processes.

In Option i, for example, when an HARQ process number for a certain TB (e.g., TB #0) is set, the HARQ process numbers for other TBs can be calculated.

In Option i, for example, the number of bits used for indicating an HARQ process number is represented by Expression 11, and the number of bits used for indicating an HARQ process is independent of the number of assigned TBs.

[11]

$$\lceil \log_2 N_{HP} \rceil \text{bit}(s) \qquad \text{(Expression 11)}$$

<Option ii>

In Option ii, for example, as with Option i, HARQ process numbers assignable to the respective multiple-TB scheduled TBs are consecutive HARQ process numbers. Additionally, in Option ii, an upper limit of the number of HARQ process numbers assignable by the multiple-TB scheduling may be set (or limited).

For example, among $N_{HP}$ pieces of HARQ processes #0 to #$N_{HP}$−1 assignable to terminal 200, HARQ process numbers assignable by the multiple-TB scheduling may be set (or limited) to $N_{Limit}$ pieces (e.g., #0 to #$N_{Limit}$−1). Here, $N_{Limit} < N_{HP}$ is acceptable. Note that, a start number of the HARQ process numbers assignable by the multiple-TB scheduling is not limited to HARQ process #0 and may be another number.

In Option ii, for example, the number of HARQ processes assignable by the multiple-TB scheduling is smaller than the largest number of HARQ processes, which can suppress an increase in an overhead of the DCI.

For example, in Option 2, the number of bits used for indicating an HARQ process number is represented by Expression 12, and $N_{Limit} < N_{HP}$; thus, the number of bits used for indicating an HARQ process can be reduced as compared to Option i.

[12]

$$\lceil \log_2 N_{Limit} \rceil \text{bit}(s) \qquad \text{(Expression 12)}$$

<Option iii>

In Option iii, for example, any HARQ process number may be assigned to each of the multiple-TB scheduled TBs.

In Option iii, for example, the number of bits used for indicating an HARQ process number is represented by Expression 13.

[13]

$$\lceil \log_2 n\text{Choosek}(N_{HP}, N) \rceil \text{bit}(s) \qquad \text{(Expression 13)}$$

Where nChoosek(x, y) denotes the number of combinations to retrieve y pieces from x pieces of items. Further, N denotes the number of assigned TBs, and $N_{HP}$ denotes the largest number of HARQ processes.

In Option iii, for example, as the number of assigned TBs, N, increases, the number of bits used for indicating an HARQ process also increases. According to Option iii, for example, for each of multiple-TB scheduled TBs, the HARQ process number can be flexibly assigned.

<Option iv>

In Option iv, for example, as with Option iii, any HARQ process number may be assigned to each of the multiple-TB scheduled TBs. Additionally, in Option iv, an upper limit of the number of HARQ process numbers assignable by the multiple-TB scheduling may be set (or limited).

For example, among $N_{HP}$ pieces of HARQ processes #0 to #$N_{HP}$−1 assignable to terminal 200, HARQ process numbers assignable by the multiple-TB scheduling may be set (or limited) to $N_{Limit}$ pieces (e.g., #0 to #$N_{Limit}$−1). Here, $N_{Limit} < N_{HP}$ is acceptable. Note that, a start number of the HARQ process numbers assignable by the multiple-TB scheduling is not limited to HARQ process #0 and may be another number.

In Option iv, for example, the number of HARQ processes assignable by the multiple-TB scheduling is smaller than the largest number of HARQ processes, which can suppress an increase in an overhead of the DCI.

In Option iv, for example, the number of bits used for indicating an HARQ process number is represented by Expression 14, and $N_{Limit} < N_{HP}$: thus, the number of bits used for indicating an HARQ process can be reduced as compared to Option iii.

[14]

$$\lceil \log_2 n\text{Choosek}(N_{Limit}, N) \rceil \text{bit}(s) \qquad \text{(Expression 14)}$$

<Option v>

In Option v, for example, an HARQ process number may be divided into a plurality of sets. In one example, an HARQ process number may be divided into set #0 {#a, #b, #c, #d} and set #1 {#e, #f, #g, #h}.

Additionally, for example, with respect to indication of an HARQ process number to a portion of the plurality of TBs to be multiple-TB scheduled (e.g., TB #0), any HARQ process number in set #0 may be explicitly indicated.

Further, with respect to identification of an HARQ process number for another TB different from TB #0, for example, terminal 200 may implicitly identify, from set #1, the HARQ process number based on the HARQ process number of set #0 that is explicitly indicated. For example, in the above example, each of HARQ processes #a to #d of set #0 and each of HARQ processes #e to #h of set #1 may be associated in a one-to-one manner. By way of example, in a case where HARQ process #a of set #0 is indicated as the HARQ process number for TB #0, terminal 200 may configure HARQ process #e of set #1 as the HARQ process number for TB #1.

In this case, assuming that the number of HARQ processes included in set #0 is N1, the number of bits used for indicating an HARQ process number is represented by Expression 15.

[15]

$$\lceil \log_2 N_1 \rceil \text{bit}(s) \qquad \text{(Expression 15)}$$

In Option v, for example, it is sufficient that, among the HARQ process numbers, an HARQ process number included in a portion of the plurality of sets is indicated. That is, an HARQ process number included in a set different from the portion of the plurality of sets need not be indicated, and thus, the number of bits used for indicating an HARQ process can be reduced.

Incidentally, the number of sets into which the HARQ process number is divided in Option v may be three or more.

Meanwhile, with respect to the indication of an HARQ process number, a set to be used may be explicitly indicated to terminal 200. For example, in the example mentioned above, set #0 may be explicitly indicated to terminal 200, and any of HARQ process numbers included in indicated set #0 may be configured for each TB. In one example, the HARQ process number for TB #0 may be configured as #a, and the HARQ process number for TB #1 may be configured as #b. In this case, assuming that the number of sets is Nset, the number of bits used for indicating of an HARQ process number is represented by Expression 16, and thus, the number of bits used for indicating an HARQ process can be reduced.

[16]

$$\lceil \log_2 N_{set} \rceil \text{bit}(s) \qquad \text{(Expression 16)}$$

Option i to Option v related to indication of an HARQ process number have been each described thus far.

In Embodiment 2, for example, in the multiple-TB scheduling, the TB of the initial transmission and the TB for the retransmission can be transmitted together. In this case, an HARQ processes different for each multiple-TB scheduled TB may be assigned.

Figure 20:
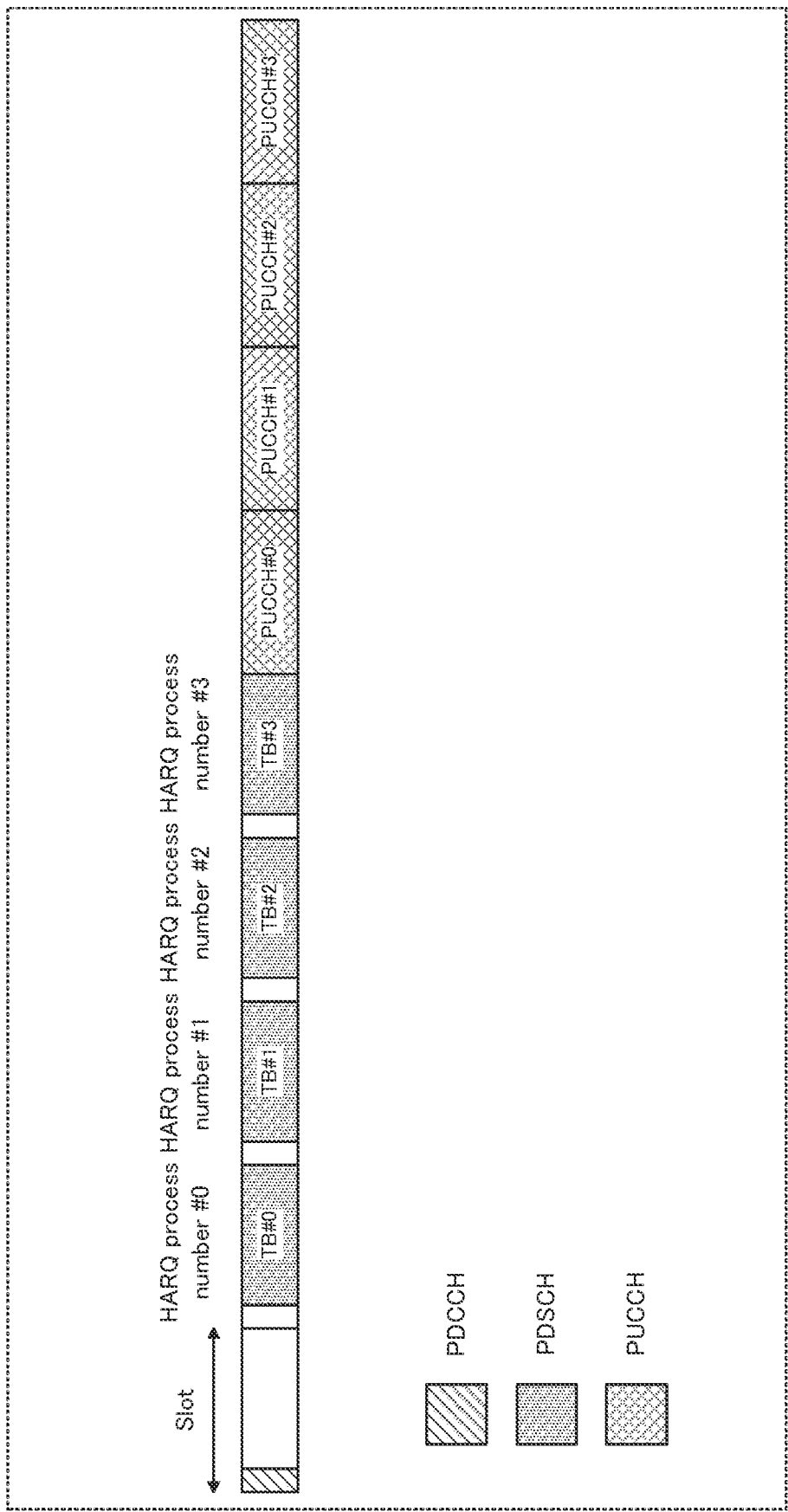
FIG. 20 illustrates an example of retransmission control according to Embodiment 2.

For example, as illustrated in FIG. 20, in terminal 200, the order of reception of the PDSCH or transmission of the PUCCH for each of multiple-TB scheduled TBs may be in HARQ process-number order.

Figure 21:
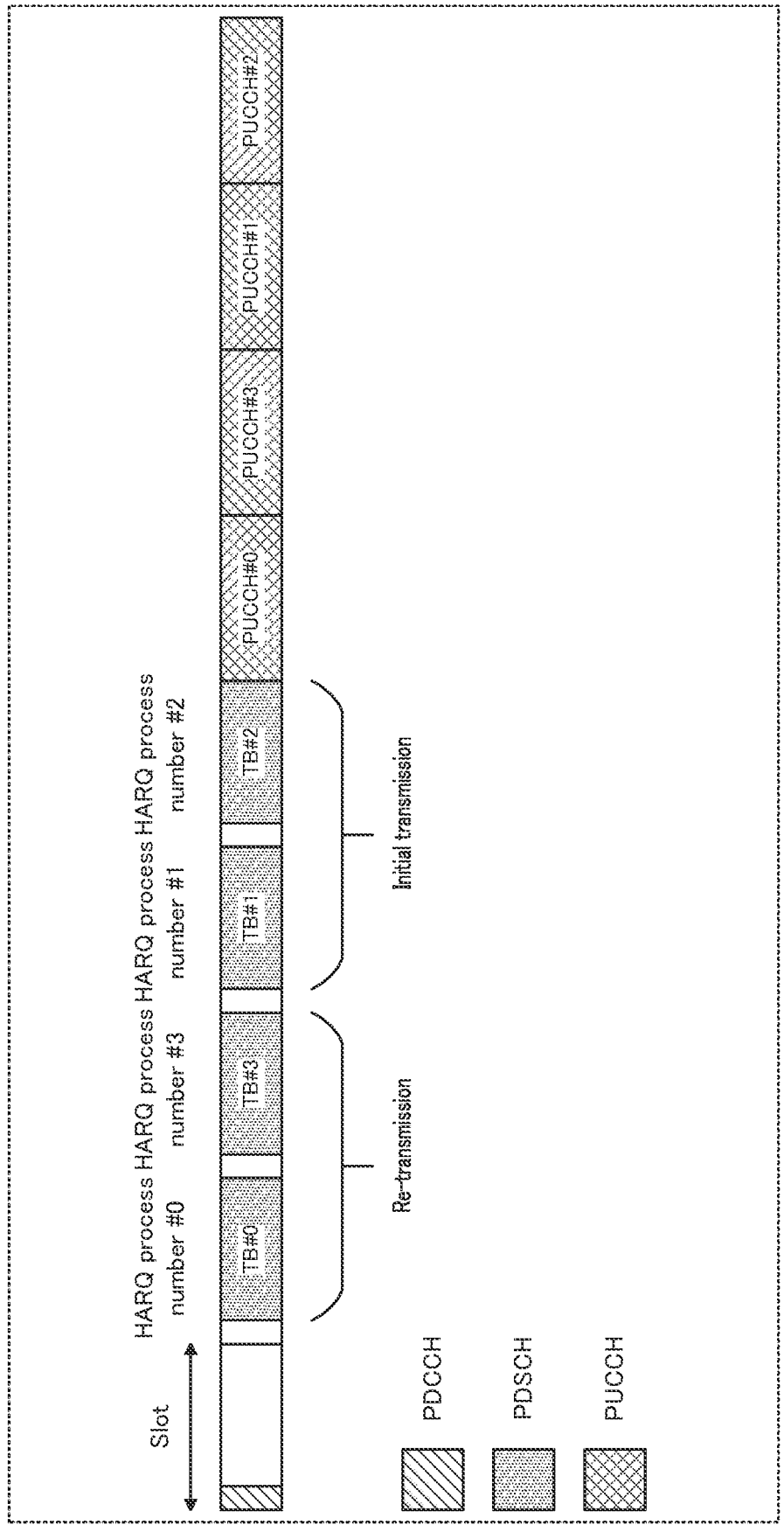
FIG. 21 illustrates another example of retransmission control according to Embodiment 2.

Alternatively, as illustrated in FIG. 21, in terminal 200, the order of reception of the PDSCH or transmission of the PUCCH for each of multiple-TB scheduled TBs may be an order in which the TB for the retransmission may be earlier than the TB of the initial transmission. This order may reduce an effect of the retransmission delay.

For example, in the multiple-TB scheduling, in a case where a TB for the initial transmission is included (i.e., TB for retransmission is not included) or in a case where a TB for retransmission is included (i.e., TB for initial transmission is not included), the order of reception of a PDSCH or transmission of a PUCCH for each TB in terminal 200 may be configured as the HARQ process-number order, as illustrated in FIG. 20. Meanwhile, for example, in the multiple-TB scheduling, in a case where the TB for the initial transmission and the TB for retransmission are transmitted together, the reception of the PDSCH or the transmission of the PUCCH for a TB for the retransmission in terminal 200 may be performed first, and then the reception of the PDSCH or the transmission of the PUCCH for a TB for the initial transmission may be performed, as illustrated in FIG. 21.

Embodiment 3

Configurations of base station 100 and terminal 200 according to the present embodiment may be, for example, the same as the configurations in Embodiment 1.

In Embodiment 1, for example, a case has been described where a common (e.g., identical) HARQ process number is assigned to a plurality of multiple-TB scheduled TBs. Meanwhile, in Embodiment 2, a case has been described where different HARQ process numbers are assigned to a plurality of multiple-TB scheduled TBs. In the present embodiment, for example, a plurality of TBs assigned by the multiple-TB scheduling (i.e., one DCI) is divided into a plurality of TB groups (hereinafter referred to as "TB group"), and a case will be described where a common (e.g., identical) HARQ process number is assigned to TBs in the identical TB group whereas different HARQ process numbers are assigned to TBs of different TB groups.

For example, base station 100 may transmit, to terminal 200, information on the number of CBGs, information on PUCCH resource allocation, and information on retransmission control including information on the number of TB groups.

This allows, for example, a trade-off between Embodiment 1 and Embodiment 2. Incidentally, in a case where the number of TB groups is one, it is equivalent to Embodiment 1, and in a case where the number of TB groups is the same as the number of assigned TBs, it is equivalent to Embodiment 2.

Figure 22:
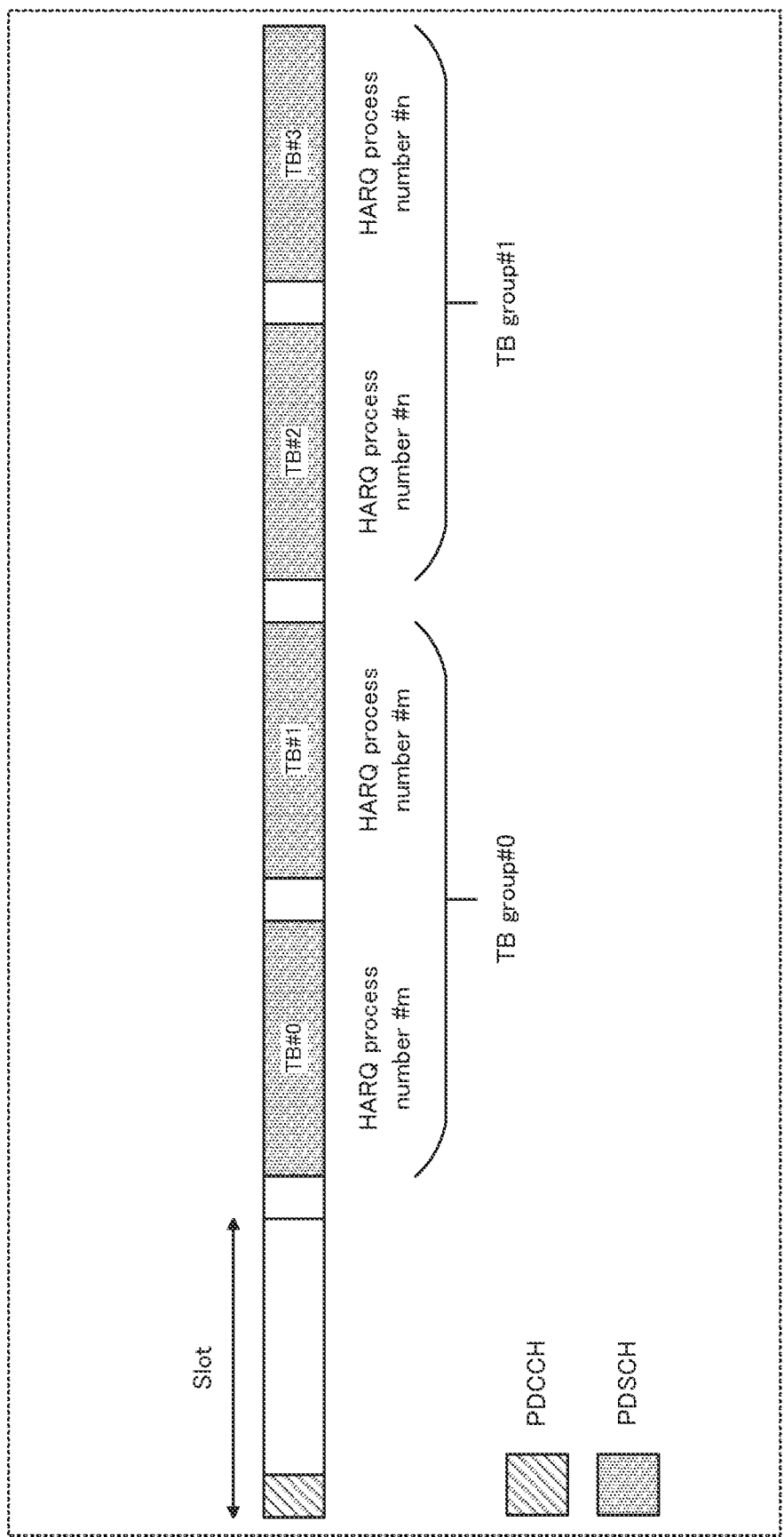
FIG. 22 illustrates a configuration example of a TB group according to Embodiment 3.

FIG. 22 is a diagram illustrating a configuration example of a TB group according to the present embodiment. FIG. 22 illustrates an example in which the number of assigned TBs, N=4, and the number of TB groups is 2.

In FIG. 22, for example, TB #0 and TB #1 are included in TB group #0, and TB #2 and TB #3 are included in TB group #1. In addition, as illustrated in FIG. 22, common HARQ process number #m may be assigned to TB #0 and TB #1 included in TB group #0, and common HARQ process number #n may be assigned to TB #2 and TB #3 included in TB group #1. In other words, different HARQ process numbers are assigned to TB #1 and TB #0 included in TB group #0 and TB #2 and TB #3 included in TB group #1.

A transmission side (e.g., base station 100) may apply, to each TB (e.g., N>1), processing such as CB segmentation, encoding per CB, Rate matching, CB concatenation, scrambling, and data-modulation, for example.

Meanwhile, DCI including scheduling information such as resource allocation from base station 100 may be transmitted to terminal 200 via PDCCH, for example. Terminal 200 may receive a PDSCH according to the resource allocation indicated by the DCI on the PDCCH, for example. In the multiple-TB scheduling, for example, a plurality of PDSCHs may be assigned to different time- or frequency-resources by one DCI. Further, each PDSCH may include, for example, a different TB. In other words, a plurality of TBs received in different time- or frequency-resources can be scheduled by one DCI. Incidentally, the MCS of the PDSCH assigned for each TB, the time resource amount (e.g., the number of symbols), or the frequency resource amount (e.g., the number of resource blocks) may be different from each other, or at least one of them may be common (e.g., identical) between TBs.

Terminal 200 may, for example, determine the size of TB received via PDSCH based on the MCS of each PDSCH, the time-resource amount, and the frequency-resource amount, and thus determine the number of CBs based on the TB size. In addition, terminal 200 may, for example, decode each CB and perform error detection in each CB by using the CB-CRC bit added to each CB. Further, when the CB segmentation is used, terminal 200 may restore a TB and perform error detection in the entire TB by using the TB-CRC added to the TB.

In the present embodiment, for the plurality of TBs assigned by the multiple-TB scheduling, terminal 200 may control retransmission for each TB group, for example.

For example, terminal 200 may apply the same operation as in Embodiment 1 to a plurality of TB in a TB group (e.g., TB to which common HARQ process number is assigned). For example, terminal 200 may set the number of CBGs, M, which is one of the parameters for the CBG-based retransmission. For example, terminal 200 may determine the number of CBs included in a CBG, based on the number of CBGs, M, in each TB group, the number of assigned TBs, $N_{TBG}$, and the number of CBs, $C_n$, (n=0 to $N_{TBG}-1$) in each TB.

Terminal 200 may, for example, transmit, to base station 100, a response signal (e.g., ACK/NACK or HARQ-ACK) for the CBG, according to an error detection result for the CBG. By way of example, terminal 200 may indicate the ACK when all CBs included in the CBG are received without an error and indicate the NACK when an error is detected in at least one of CBs included in the CBG. Base station 100 may, for example, re-transmit the CBG corresponding to the NACK that has been indicated from terminal 200.

Further, in the present embodiment, for example, regardless of whether each TB group is divided into a plurality of CBs, an HARQ process different for each TB group may be assigned. For example, terminal 200 may apply an operation similar to that in Embodiment 2 for different TB groups.

For example, in a TB group including a plurality of TBs assigned the same HARQ process number, data may be re-transmitted until ACKs are received for all TBs or all CBGs.

The retransmission can be controlled by, for example, the DCI including the HARQ process number, the NDI, and the RV. Meanwhile, the CBG-based retransmission can be controlled by, for example, the DCI including the CBGTI and the CBGFI.

Meanwhile, the response signal (e.g., ACK/NACK or HARQ-ACK) may be transmitted via, for example, an uplink control channel (e.g., PUCCH) or may be transmitted on a PUSCH resource when a PUCCH resource overlaps with the PUSCH resource in time.

Further, the PUCCH resource for transmitting the response signal can be controlled by, for example, the DCI including a PRI. Terminal 200 may determine the retransmission control method and the number of HARQ-ACK bits for the multiple-TB scheduling, based on the number of CBGs, M, included in the TB group, the number of assigned TBs, $N_{TBG}$, and the number of CBs, $C_n$, (n=0 to $N_{TBG}-1$) in each TB. The number of HARQ-ACK bits may be M bits, for example, in the case of the number of CBGs, M.

Further, as for identifying the PUCCH resource for transmitting a HARQ-ACK bit sequence for each TB group, a method of indicating a PUCCH resource to be used by terminal 200 among a plurality of PUCCH resources (e.g., candidates) included in a union of PUCCH resources (PUCCH resource set) may be employed, for example. Note that, the PUCCH resource set may be semi-statically configured, from base station 100 for terminal 200, by an UE-specific higher layer signaling (RRC signal), and the PUCCH resource to be used by terminal 200 in the PUCCH resource set may be indicated by the DCI (e.g., PRI field), for example.

Further, as for identifying the PUCCH resource for transmitting a HARQ-ACK bit for each TB group, terminal 200 may, for example, apply a TB in any of Options 1 to 5 related to identification of the PUCCH resource of Embodiment 2 with TB group by replacing a TB group.

Further, for example, in a case where the number of PUCCH resources included in the PUCCH resource set is greater than a threshold value (e.g., eight), the PUCCH resources may be controlled using, in addition to the PRI field of the DCI, information on a CCE, which is a radio resource unit of a PDCCH that transmits the DCI. Here, a PUCCH resource may be configured with, for example, a parameter such as a PUCCH format, a time resource (e.g., symbol position or the number of symbols), a frequency resource (e.g., PRB number, the number of PRBs, or whether frequency hopping is applied), and a code resource (e.g., cyclic shift sequence number or orthogonal code number). Meanwhile, for example, a plurality of PUCCH resource sets may be configured for terminal 200, and the PUCCH resource set to be used by terminal 200 may be determined based on the number of HARQ-ACK bits.

Hence, according to the present embodiment, dividing a plurality of TBs assigned by the multiple-TB scheduling into a plurality of TB groups makes it possible to, for example, perform the indication (e.g., indication by DCI) from base station 100 to terminal 200 in units of TB groups, and thus, an increase in an overhead of the DCI can be suppressed.

Variation of Embodiment 3

The number of TB groups to be set to terminal 200 may be, for example, the largest number of TB groups, that is, Tmax. In this case, the actual number of TB groups may be determined according to the following Expression 17.

[17]

$$T=\min(T_{max}, N) \quad \text{(Expression 17)}$$

Where N represents the number of assigned TBs.

In addition, for example, when N/T is an integer, each TB group may include therein N/M pieces of TBs. On the other hand, for example, when N/M is not an integer, TBs of Expression 18 may be included in TB group #0 to TB group #T−2, and TBs of Expression 19 may be included in TB group #T−1. Here, the TB group including TBs of Expression 20 is not limited to TB group #T−1 and may be TB group #0 or another TB.

[18]

$$[N/M] \text{piece}(s) \qquad \text{(Expression 18)}$$

[19]

$$N-(T-1)[N/M] \text{piece}(s) \qquad \text{(Expression 19)}$$

[20]

$$N-(T-1)[N/M] \text{piece}(s) \qquad \text{(Expression 20)}$$

In addition, a method of determining the number of TBs included in the TB group is not limited to the above. For example, assuming $T_1$=mod(N, M), TBs of Expression 21 may be included in TB Group #0 to TB Group $T_1$−1, and TBs of Expression 22 may be included in TB Group TB group #$T_1$ to TB group T−1.

[21]

$$[N/M] \text{piece}(s) \qquad \text{(Expression 21)}$$

[22]

$$[N/M] \text{piece}(s) \qquad \text{(Expression 22)}$$

The number of TB groups or the largest number of TB groups may be, for example, semi-statically indicated to terminal 200 by the higher layer (e.g., RRC signal) or dynamically indicated by the DCI. In a case where the number of TB groups or the largest number of TB groups is dynamically indicated by the DCI, for example, a bit field for indicating the number of TB groups or the largest number of TB groups may be independently configured in the DCI, or the number of TB groups or the largest number of TB groups may be indicated together with a time domain resource in a TDRA field for indicating the time domain resource for the DCI. Alternatively, the number of TB groups or the largest number of TB groups may be indicated together with the bit field for indicating the number of TBs, for example.

Further, for example, the number of TBs included in one TB group may be fixed. In this case, terminal 200 may, for example, determine the number of TB groups based on the number of assigned TBs, N, and then determine the retransmission control method and the number of HARQ-ACK bits for the multiple-TB scheduling.

The embodiments according to an exemplary embodiment of the present disclosure have been described thus far.

Incidentally, in NR, a priority can be configured for an HARQ-ACK, for example. For example, in a case of two types of priority level, any of priority index=0 (e.g., low priority) and priority index=1 (e.g., high priority) can be configured for the HARQ-ACK. In the multiple-TB scheduling, for example, the priority may be configured for the HARQ-ACK, for each TB or TB group. Further, for example, in Embodiment 3, the priority of the HARQ-ACK may be determined in association with an HARQ process number.

Further, in NR, for example, there is a function to assign two codewords in DCI format 1-1 for scheduling a PDSCH. This function allows, for example, indicating NDI and an RV for each codeword. Therefore, for example, in Embodiment 2 or Embodiment 3, NDI and RV fields for each codeword of DCI format 1-1 may be configured (i.e., repurposed) for each of a plurality of TBs or a plurality of TB groups. Incidentally, the number of assigned TBs is set (or, limited) to two in Embodiment 2, the number of TB groups is set (or, limited) to two in Embodiment 3. Further, for example, when the multiple-TB scheduling is applied, two-codeword transmission may not be used.

Further, in the above-described embodiments, an example has been described in which one TB is transmitted or received in one slot, but the present disclosure is not limited to this case, and, for example, a plurality of TBs may be transmitted or received in one slot, and one TB may be transmitted or received over a plurality of slots.

Further, in the above-described embodiments, the description has been given of the retransmission control for a PDSCH, that is, reception of the PDSCH at terminal 200 and transmission of an HARQ-ACK in a PUCCH or a PUSCH to base station 100, but the present disclosure is not limited to this case. An exemplary embodiment of the present disclosure may also be applied to, for example, retransmission control for a PUSCH, that is, transmission of the PUSCH at terminal 200 and reception of an HARQ-ACK from base station 100.

Further, an exemplary embodiment of the present disclosure may be applied in a scenario having a longer Round Trip Time (RTT), such as. Non-Terrestrial Network (NTN) or an operation in a frequency band of 52.6 GHz or higher. In this scenario, for example, the number of HARQ processes may be decreased as compared to the RTT. For example, slot length×number of HARQ processes <RTT may be possible. Hence, for example, an effect of the HARQ process shortage can be reduced by assigning a common HARQ process number to a plurality of TBs scheduled by one DCI, as in Embodiment 1.

In addition, each parameter applied in the above-described embodiment (e.g., the number of assigned TBs. N, the number of CBGs, M, the number of CBs, $C_n$, included in TB #n, or the number of CBs included in CBG) is merely an example and may be other values. In addition, in the above-described embodiments, the number of CBs or the number of CBGs included in the plurality of TBs may be different from each other.

(Control Signal)

In an exemplary embodiment of the present disclosure, the downlink control signal (or downlink control information) may be, for example, a signal (or information) transmitted at a Physical Downlink Control Channel (PDCCH) in the physical layer, or a signal (or information) transmitted at Medium Access Control (MAC) or Radio Resource Control (RRC) in the higher layer. In addition, the signal (or information) is not limited to a case of being indicated by the downlink control signal and may be previously specified by the specifications (or standards) or may be previously configured in a base station and a terminal.

In an exemplary embodiment of the present disclosure, the uplink control signal (or uplink control information) may be, for example, a signal (or information) transmitted in a PDCCH in the physical layer, or a signal (or information) transmitted in MAC or RRC in the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may be adopted instead of a base station. Further, instead of a base station, a relay apparatus may be adopted for relaying the communication between a higher node and a terminal.

(Uplink/Downlink/Sidelink)

An exemplary embodiment of the present disclosure may be applied to, for example, any of the uplink, downlink, and sidelink. In one example, an exemplary embodiment of the present disclosure may be applied to a Physical Uplink Shared Channel (PUSCH), a Physical Uplink Control Channel (PUCCH), and a Physical Random Access Channel (PRACH) in uplink, a Physical Downlink Shared Channel (PDSCH), a PDCCH, and a Physical Broadcast Channel (PBCH) in downlink, or a Physical Sidelink Shared Channel (PSSCH), a Physical Sidelink Control Channel (PSCCH), and a Physical Sidelink Broadcast Channel (PSBCH) in sidelink.

The PDCCH, the PDSCH, the PUSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and the PSBCH are examples of a broadcast channel, and the PRACH is an example of a random access channel.

(Data Channel/Control Channel)

An exemplary embodiment of the present disclosure may be applied to, for example, any of a data channel and a control channel. In one example, a channel in an exemplary embodiment of the present disclosure may be replaced with any of a PDSCH, a PUSCH, and a PSSCH for the data channel, or a PDCCH, a PUCCH, a PBCH, a PSCCH, and a PSBCH for the control channel.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of: a Demodulation Reference Signal (DMRS); a Channel State Information-Reference Signal (CSI-RS): a Tracking Reference Signal (TRS); a Phase Tracking Reference Signal (PTRS); a Cell-specific Reference Signal (CRS); or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above and may be other numbers of symbols.

(Frequency Band)

An exemplary embodiment of the present disclosure may be applied to either of a licensed band or an unlicensed band.

(Communication)

An exemplary embodiment of the present disclosure may be applied to any of the communication between a base station and a terminal, the communication between terminals (Sidelink communication, Uu link communication), and the communication for Vehicle to Everything (V2X). In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either of terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network.

(Antenna Port)

In an exemplary embodiment of the present disclosure, an antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 23:
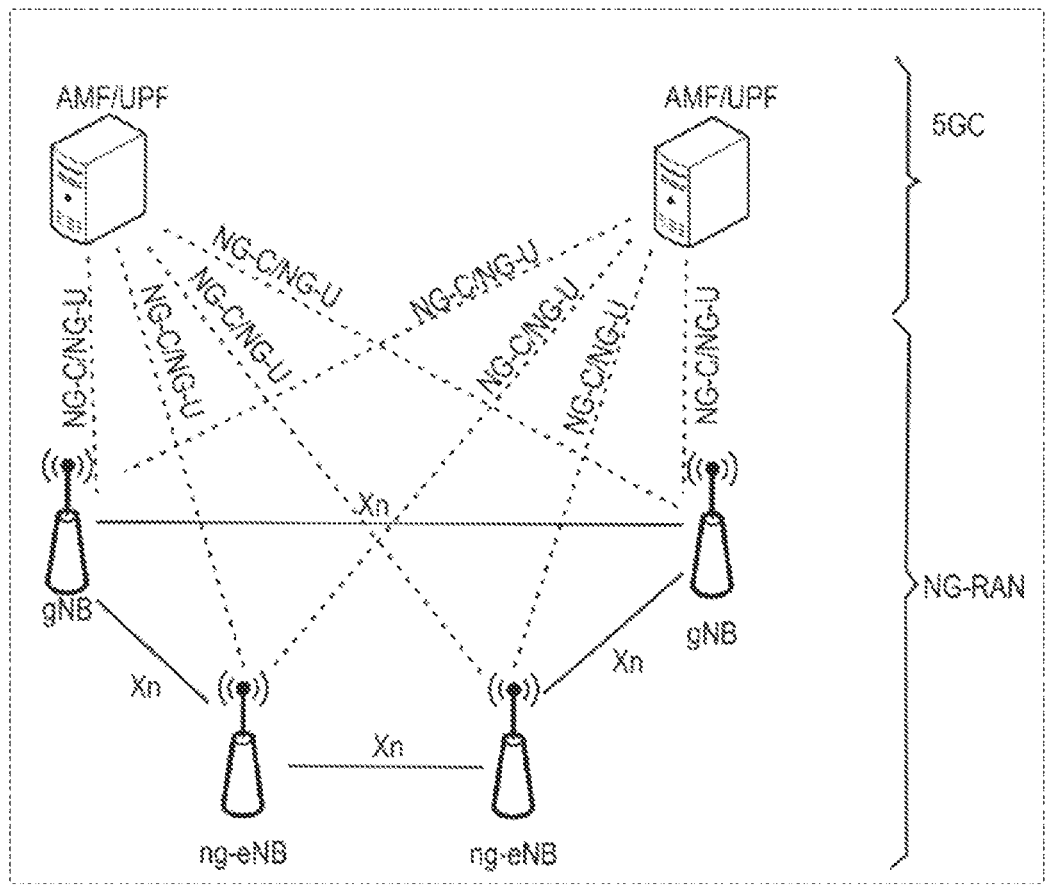
FIG. 23 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 23 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPPTS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/kM$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 50 NR>

Figure 24:
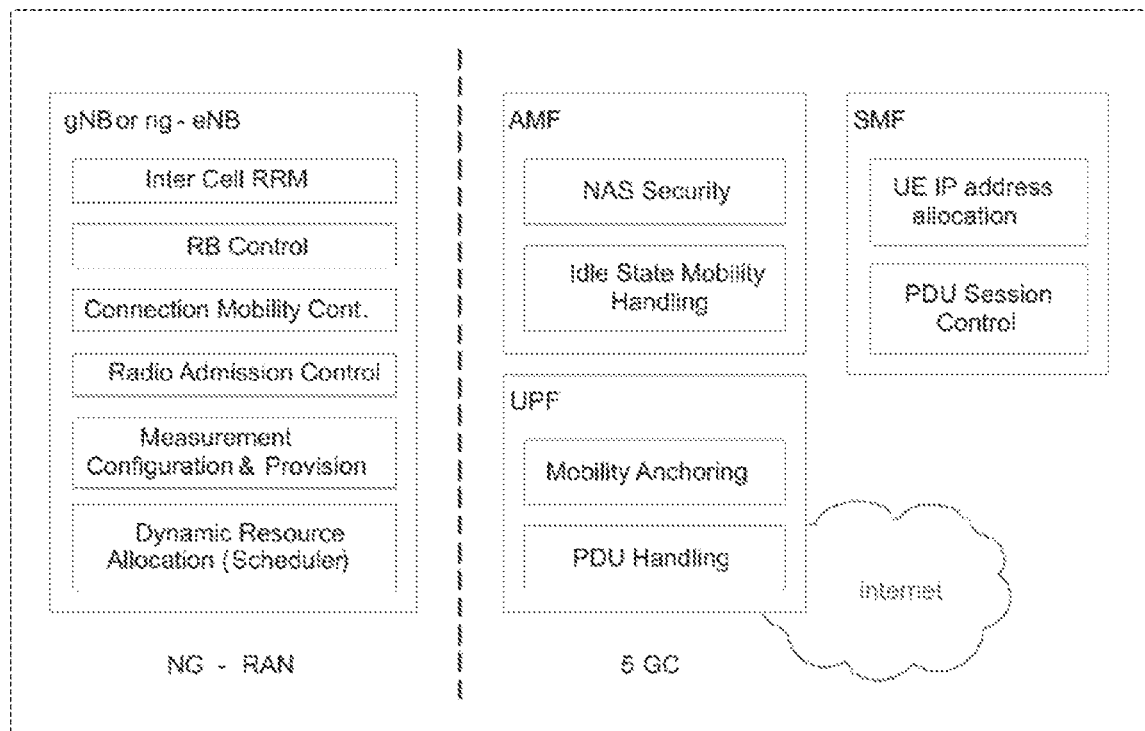
FIG. 24 schematically illustrates a functional split between Next Generation-Radio Access Network (NG-RAN) and 5th Generation Core (5GC)

FIG. 24 illustrates the functional split between the NG-RAN and the 5GC. A logical node of the NO-RAN is gNB or ng-eNB. The 5GC includes logical nodes AMF, UPF, and SMF.

For example, gNB and ng-eNB hosts the following main functions:
Radio Resource Management functions such as Radio Bearer Control, Radio Admission Control, Connection Mobility Control, and dynamic allocation (scheduling) of both uplink and downlink resources to a UE;
IP header compression, encryption, and integrity protection of data;
Selection of an AMF during UE attachment in such a case when no routing to an AMF can be determined from the information provided by the UE;
Routing user plane data towards the UPF;
Routing control plane information towards the AMF;
Connection setup and release;
Scheduling and transmission of paging messages;
Scheduling and transmission of system broadcast information (originated from the AMF or an operation management maintenance function (OAM: Operation, Admission, Maintenance));
Measurement and measurement reporting configuration for mobility and scheduling;
Transport level packet marking in the uplink;
Session management;
Support of network slicing;
QoS flow management and mapping to data radio bearers;
Support of UEs in the RRC_INACTIVE state;
Distribution function for NAS messages;
Radio access network sharing;
Dual connectivity; and
Tight interworking between NR and E-UTRA.

The Access and Mobility Management Function (AMF) hosts the following main functions:
Function of Non-Access Stratum (NAS) signaling termination;
NAS signaling security;
Access Stratum (AS) security control;
Inter-Core Network (CN) node signaling for mobility between 3GPP access networks;
Idle mode UE reachability (including control and execution of paging retransmission);
Registration area management;
Support of intra-system and inter-system mobility;
Access authentication;
Access authorization including check of roaming rights;
Mobility management control (subscription and policies);
Support of network slicing; and
Session Management Function (SMF) selection.

In addition, the User Plane Function (UPF) hosts the following main functions:
Anchor Point for intra-/inter-RAT mobility (when applicable);
External Protocol Data Unit (PDU) session point for interconnection to a data network;
Packet routing and forwarding;
Packet inspection and a user plane part of Policy rule enforcement;
Traffic usage reporting;
Uplink classifier to support routing traffic flows to a data network;
Branching point to support multi-homed PDU session;

QoS handling for user plane (e.g., packet filtering, gating, UUDL rate enforcement);

Uplink traffic verification (SDF to QoS flow mapping); and

Function of downlink packet buffering and downlink data notification triggering.

Finally, the Session Management Function (SMF) hosts the following main functions:

Session management,

UE IP address allocation and management;

Selection and control of UPF;

Configuration function for traffic steering at the User Plane Function (UPF) to route traffic to a proper destination;

Control part of policy enforcement and QoS: and

Downlink data notification.

<RRC Connection Setup and Reconfiguration Procedure>

Figure 25:
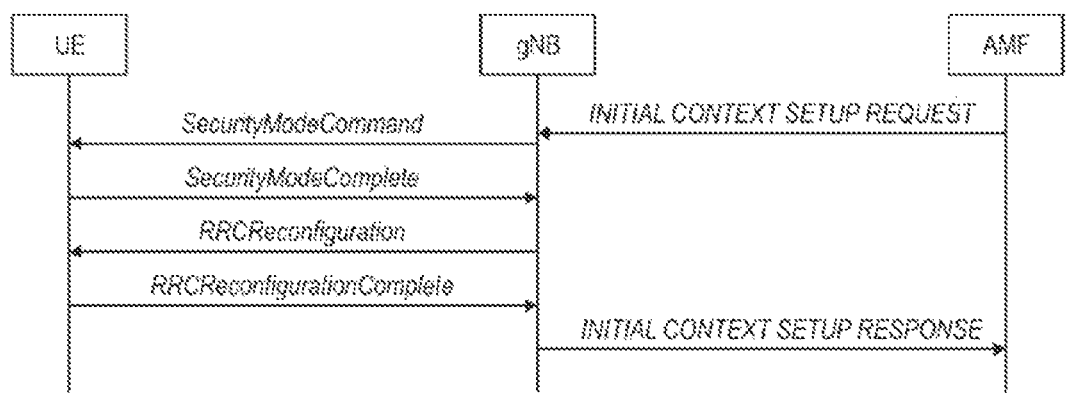
FIG. 25 is a sequence diagram of a Radio Resource Control (RRC) connection setup/reconfiguration procedure.

FIG. 25 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NO) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of MT for 2020 and Beyond>

Figure 26:
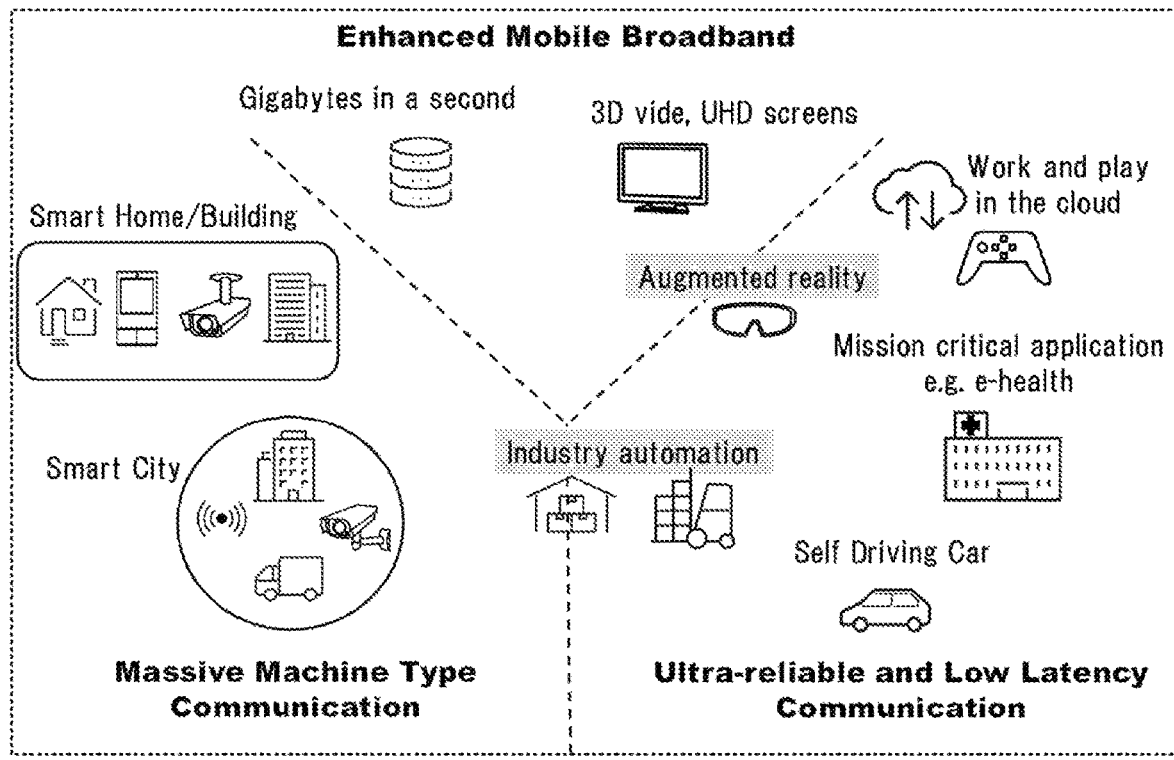
FIG. 26 schematically illustrates usage scenarios of enhanced Mobile BroadBand (eMBB), massive Machine Type Communications (mMTC), and Ultra Reliable and Low Latency Communications (URLLC)

FIG. 26 illustrates some of the use cases for 50 NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 26 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-heath, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 25. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 27:
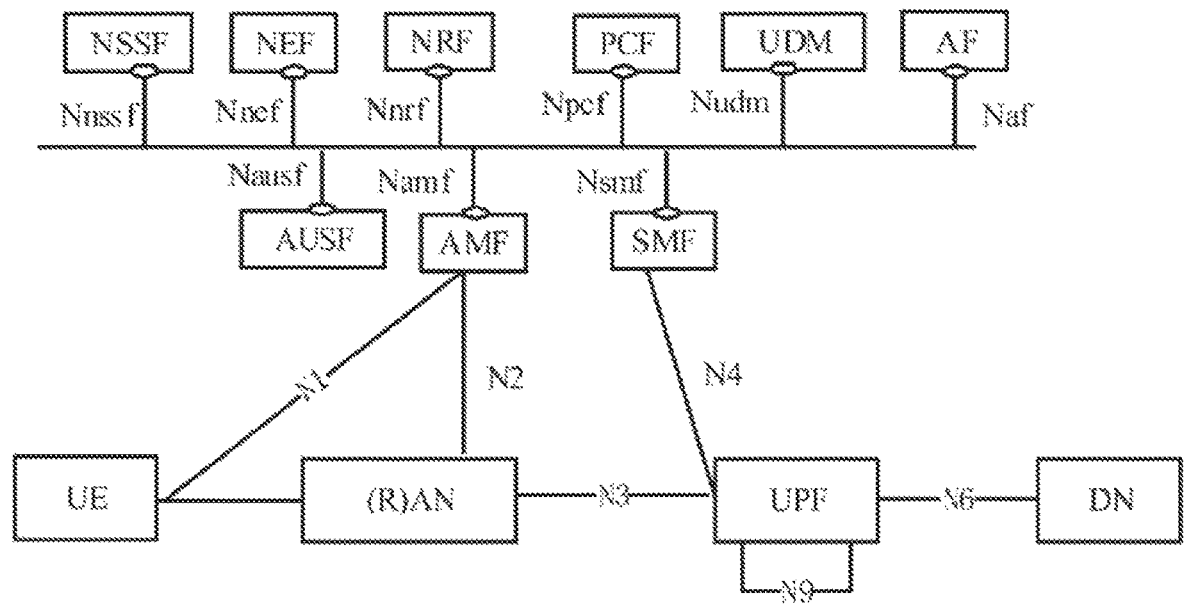
FIG. 27 is a block diagram illustrating an exemplary 5G system architecture for a non-roaming scenario.

FIG. 27 illustrates a 5G NR non-roaming reference architecture (see TS 23.501 v 16.1.0, section 4.23). An Application Function (AF) (e.g., an external application server hosting 50 services, exemplarily described in FIG. 26) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 27 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services. Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: control circuitry, which, in operation, executes retransmission control for a plurality of transport blocks in units of code block groups each including at least one of code blocks in any one or more of the plurality of transport blocks; and communication circuitry, which, in operation, performs communication according to the retransmission control.

In an exemplary embodiment of the present disclosure, the control circuitry determines the number of the code blocks included in the code block group, based on the number of the plurality of transport blocks, the number of the code block groups in the plurality of transport blocks, and the number of the code blocks included in the plurality of transport blocks.

In an exemplary embodiment of the present disclosure, an identification number that relates to the retransmission control and is assigned to the plurality of transport blocks is common to the plurality of transport blocks.

In an exemplary embodiment of the present disclosure, the communication circuitry transmits, with a common uplink resource, a response signal that is based on an error detection result in units of the plurality of transport blocks.

In an exemplary embodiment of the present disclosure, the control circuitry determines the number of the code blocks included in the code block group, based on the number of the code block groups in each of the plurality of transport blocks and the number of the code blocks in each of the plurality of transport blocks.

In an exemplary embodiment of the present disclosure, an identification number that relates to the retransmission control and is assigned to the plurality of transport blocks is different in units of the plurality of transport blocks.

In an exemplary embodiment of the present disclosure, the communication circuitry transmits, with one uplink resource, a response signal that is based on an error detection result for an entirety of the plurality of transport blocks.

In an exemplary embodiment of the present disclosure, the communication circuitry transmits, with one uplink resource, a signal obtained by multiplexing a response signal that is based on an error detection result in units of the plurality of transport blocks.

In an exemplary embodiment of the present disclosure, the communication circuitry transmits, with a plurality of uplink resources, a response signal that is based on an error detection result in units of the plurality of transport blocks.

In an exemplary embodiment of the present disclosure, the communication circuitry receives a plurality of information sets that indicates the plurality of uplink resources.

In an exemplary embodiment of the present disclosure, the communication circuitry receives information that indicates a combination of the plurality of uplink resources.

In an exemplary embodiment of the present disclosure, the communication circuitry receives information that indicates a portion of the plurality of uplink resources, and the control circuitry determines, based on the portion of the plurality of uplink resources, another resource different from the portion of the plurality of uplink resources.

In an exemplary embodiment of the present disclosure, the control circuitry determines the number of the code blocks included in the code block group, based on the number of the code block groups in each of a plurality of groups obtained by dividing the plurality of transport blocks and the number of the code blocks in each of the plurality of transport blocks.

A base station according to an exemplary embodiment of the present disclosure includes: control circuitry, which, in operation, executes retransmission control for a plurality of transport blocks in units of code block groups each including at least one of code blocks in any one or more of the plurality of transport blocks: and communication circuitry, which, in operation, performs communication according to the retransmission control.

A communication method according to an exemplary embodiment of the present disclosure includes: executing, by a terminal, retransmission control for a plurality of transport blocks in units of code block groups each including at least one of code blocks in any one or more of the plurality of transport blocks; and performing, by the terminal, communication according to the retransmission control.

A communication method according to an exemplary embodiment of the present disclosure includes: executing, by a terminal, retransmission control for a plurality of transport blocks in units of code block groups each including at least one of code blocks in any one or more of the plurality of transport blocks: and performing, by the terminal, communication according to the retransmission control.

The disclosure of Japanese Patent Application No. 2020-133858, filed on Aug. 6, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 205 Controller
102 Higher-layer control signal generator
103 Downlink control information generator
104, 206 Encoder
105, 207 Modulator
106, 208 Signal assigner
107, 209 Transmitter
108, 201 Receiver
109, 202 Extractor
110, 203 Demodulator
111, 204 Decoder
200 Terminal

The invention claimed is:

1. A terminal, comprising:
a receiver, which, in operation, receives a downlink control information (DCI) including information relating to a retransmission of multiple physical downlink shared channels (PDSCHs), and receives the multiple PDSCHs indicated by the DCI; and
circuitry, which, in operation, decode the multiple PDSCHs,
wherein the retransmission of the multiple PDSCHs is controlled based on one or more hybrid automatic repeat request (HARQ) process numbers that identifies one or more HARQ processes, and the multiple PDSCHs have consecutive HARQ process numbers.

2. The terminal according to claim 1, wherein the DCI includes a separate time resource information for each of the multiple PDSCHs.

3. The terminal according to claim 1, wherein the DCI includes a common frequency resource information or a common modulation and coding scheme (MCS) for the multiple PDSCHs.

4. The terminal according to claim 1, wherein the retransmission of the multiple PDSCHs is controlled for each of a plurality of transport blocks, separately.

5. The terminal according to claim 1, wherein the retransmission of the multiple PDSCHs is controlled based on a New data indicator and a Redundancy version.

6. The terminal according to claim 1, wherein a response signal to the multiple PDSCHs is transmitted in a physical uplink control channel (PUCCH) or in a physical uplink shared channel (PUSCH).

7. The terminal according to claim 6, wherein the PUCCH is determined based on a PUCCH resource indicator (PRI) included in the DCI.

8. The terminal according to claim 1, wherein a plurality of response signals to the multiple PDSCH are transmitted on a PUCCH.

9. A communication method, comprising:

receiving a downlink control information (DCI) including information relating to a retransmission of multiple physical downlink shared channels (PDSCHs), and receiving the multiple PDSCHs indicated by the DCI; and decoding the multiple PDSCHs, wherein the retransmission of the multiple PDSCHs is controlled based on one or more hybrid automatic repeat request (HARQ) process numbers that identifies one or more HARQ processes, and the multiple PDSCHs have consecutive HARQ process numbers.

10. The communication method according to claim 9, wherein the DCI includes a separate time resource information for each of the multiple PDSCHs.

11. The communication method according to claim 9, wherein the DCI includes a common frequency resource information or a common modulation and coding scheme (MCS) for the multiple PDSCHs.

12. The communication method according to claim 9, wherein the retransmission of the multiple PDSCHs is controlled for each of a plurality of transport blocks, separately.

13. The communication method according to claim 9, wherein the retransmission of the multiple PDSCHs is controlled based on New data indicator and a Redundancy version.

14. The communication method according to claim 9, wherein a response to the multiple PDSCHs is transmitted in a physical uplink control channel (PUCCH) or in a physical uplink shared channel (PUSCH).

15. The communication method according to claim 14, wherein the PUCCH is determined based on a PUCCH resource indicator (PRI) included in the DCI.

16. The communication method according to claim 9, wherein a plurality of response signals to the multiple PDSCH are transmitted on a PUCCH.

* * * * *